United States Patent
Krull et al.

(10) Patent No.: US 10,927,277 B2
(45) Date of Patent: Feb. 23, 2021

(54) ADHESIVE ARTICLES PERMITTING DAMAGE FREE REMOVAL

(71) Applicant: 3M INNOVATIVE PROPERTIES COMPANY, St. Paul, MN (US)

(72) Inventors: Brett P. Krull, Saint Anthony, MN (US); Dawud H. Tan, Lakeland, MN (US); Bradley W. Eaton, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/641,812

(22) PCT Filed: Aug. 24, 2018

(86) PCT No.: PCT/US2018/047939
§ 371 (c)(1),
(2) Date: Feb. 25, 2020

(87) PCT Pub. No.: WO2019/040862
PCT Pub. Date: Feb. 28, 2019

(65) Prior Publication Data
US 2020/0224060 A1    Jul. 16, 2020

Related U.S. Application Data

(60) Provisional application No. 62/550,190, filed on Aug. 25, 2017.

(51) Int. Cl.
*C09J 7/30* (2018.01)
*B32B 7/06* (2019.01)
(Continued)

(52) U.S. Cl.
CPC ............. *C09J 7/245* (2018.01); *B32B 7/06* (2013.01); *B32B 7/12* (2013.01); *B32B 27/08* (2013.01);
(Continued)

(58) Field of Classification Search
CPC ... C09J 7/245; C09J 7/403; C09J 7/401; C09J 7/30; C09J 2400/143; C09J 2400/263;
(Continued)

(56) References Cited

U.S. PATENT DOCUMENTS 3,691,140 A    9/1972    Silver
3,780,537 A    12/1973    Spencer
(Continued)

FOREIGN PATENT DOCUMENTS

DE    3331016    7/1992
JP    H8-81660    3/1996
(Continued)

OTHER PUBLICATIONS

Davies, "The Separation of Airborne Dust Particles", Institution of Mechanical Engineers, London, Proceedings (B) 1952-53, vol. 1B, Nos. 1-12, pp. 185-198.
(Continued)

*Primary Examiner* — Patricia L. Nordmeyer
(74) *Attorney, Agent, or Firm* — Kevin Weber

(57) ABSTRACT

The present disclosure provides adhesive articles that can be removed from surfaces without damage by having reduced or eliminated contribution of a core backing to peel force generated by the adhesive during removal. In some instances, this can be accomplished by a core that loses structural integrity in a direction normal to a plane defined by a major surface. In other instances, the contribution is reduced by compromising the interface between the core and a peelable adhesive layer.

19 Claims, 6 Drawing Sheets

(51) Int. Cl.
 B32B 7/12 (2006.01)
 C09J 7/24 (2018.01)
 C09J 7/40 (2018.01)
 B32B 27/08 (2006.01)
 B32B 27/30 (2006.01)
 B32B 27/32 (2006.01)

(52) U.S. Cl.
 CPC ............ *B32B 27/302* (2013.01); *B32B 27/32* (2013.01); *C09J 7/30* (2018.01); *C09J 7/401* (2018.01); *C09J 7/403* (2018.01); *B32B 2405/00* (2013.01); *C09J 2400/143* (2013.01); *C09J 2400/263* (2013.01); *C09J 2423/04* (2013.01); *C09J 2425/00* (2013.01); *C09J 2453/00* (2013.01); *C09J 2467/005* (2013.01); *C09J 2483/00* (2013.01); *Y10T 428/1476* (2015.01)

(58) Field of Classification Search
 CPC .............. C09J 2423/04; C09J 2425/00; C09J 2453/00; C09J 2467/005; C09J 2483/00; B32B 7/06; B32B 7/12; B32B 27/08; B32B 27/302; B32B 27/32; B32B 2405/00
 See application file for complete search history.

(56) References Cited

U.S. PATENT DOCUMENTS

| | | | |
|---|---|---|---|
| 3,802,817 | A | 4/1974 | Matsuki |
| 3,857,731 | A | 12/1974 | Merrill, Jr. |
| 4,166,152 | A | 8/1979 | Baker |
| 4,472,480 | A | 9/1984 | Olson |
| 4,640,810 | A | 2/1987 | Laursen |
| 4,726,982 | A | 2/1988 | Traynor |
| 4,736,048 | A | 4/1988 | Brown |
| 4,844,973 | A * | 7/1989 | Konishi .............. C09J 7/21 442/149 |
| 4,980,443 | A | 12/1990 | Kendziorski |
| 5,082,706 | A | 1/1992 | Tangney |
| 5,114,787 | A | 5/1992 | Chaplin |
| 5,167,765 | A | 12/1992 | Nielsen |
| 5,256,231 | A | 10/1993 | Gorman |
| 5,277,976 | A | 1/1994 | Hogle |
| 5,409,189 | A | 4/1995 | Luehmann |
| 5,491,012 | A | 2/1996 | Luehmann |
| 5,501,679 | A | 3/1996 | Krueger |
| 5,507,464 | A | 4/1996 | Hamerski |
| 5,516,581 | A | 5/1996 | Kreckel |
| 5,643,397 | A | 7/1997 | Gorman |
| 5,697,961 | A | 12/1997 | Kiamil |
| 5,843,145 | A | 12/1998 | Brink |
| 5,958,802 | A * | 9/1999 | Wilson .............. C09J 7/21 442/43 |
| 5,965,256 | A | 10/1999 | Barrera |
| 5,967,474 | A | 10/1999 | doCanto |
| 5,989,708 | A | 11/1999 | Kreckel |
| 6,082,686 | A | 7/2000 | Schumann |
| 6,129,964 | A | 10/2000 | Seth |
| 6,131,864 | A | 10/2000 | Schumann |
| 6,403,206 | B1 | 6/2002 | Bries |
| 6,429,159 | B1 | 8/2002 | Watanabe |
| 6,569,521 | B1 | 5/2003 | Sheridan |
| 6,572,945 | B2 | 6/2003 | Bries |
| 6,607,624 | B2 | 8/2003 | Berrigan |
| 6,730,397 | B2 | 5/2004 | Melancon |
| 6,811,126 | B2 | 11/2004 | Johansson |
| 6,835,452 | B1 | 12/2004 | Hamerski |
| 6,972,141 | B1 | 12/2005 | Bries |
| 7,028,958 | B2 | 4/2006 | Pitzen |
| 7,781,056 | B2 | 8/2010 | Bries |
| 7,795,326 | B2 | 9/2010 | Salamone |
| 8,162,153 | B2 | 4/2012 | Fox |
| 8,202,594 | B2 | 6/2012 | Kobayashi |
| D665,653 | S | 8/2012 | Thompson |
| 8,240,484 | B2 | 8/2012 | Fox |
| 8,530,021 | B2 | 9/2013 | Bartusiak |
| 8,708,305 | B2 | 4/2014 | McGreevy |
| 9,139,940 | B2 | 9/2015 | Berrigan |
| 9,469,091 | B2 | 10/2016 | Henke |
| 9,493,680 | B2 | 11/2016 | Schuemann |
| 2003/0077423 | A1 | 4/2003 | Flanigan |
| 2003/0170443 | A1 | 11/2003 | Kobe et al. |
| 2004/0131846 | A1 | 7/2004 | Epple |
| 2005/0137375 | A1 | 6/2005 | Hansen |
| 2009/0272491 | A1 | 11/2009 | Kobayashi |
| 2010/0274333 | A1 | 10/2010 | Dunshee |
| 2011/0000845 | A1 | 1/2011 | Fox |
| 2011/0300361 | A1 | 12/2011 | Nakayama |
| 2012/0171913 | A1 | 7/2012 | Fox |
| 2013/0101805 | A1 | 4/2013 | Altshuler |
| 2013/0316115 | A1 | 11/2013 | Smith et al. |
| 2014/0041786 | A1 | 2/2014 | Henke |
| 2014/0083608 | A1 | 3/2014 | Schubert |
| 2014/0127501 | A1 | 5/2014 | Schuemann |
| 2014/0147625 | A1 * | 5/2014 | Lin .............. C09J 7/22 428/140 |
| 2014/0335299 | A1 | 11/2014 | Wang |
| 2014/0370221 | A1 * | 12/2014 | Chen .............. C09J 7/26 428/40.2 |
| 2015/0027625 | A1 | 1/2015 | Wright |
| 2015/0034104 | A1 | 2/2015 | Zhou |
| 2016/0002838 | A1 | 1/2016 | Ausen |
| 2017/0022339 | A1 | 1/2017 | Hanschen |
| 2017/0051442 | A1 | 2/2017 | Endle |

FOREIGN PATENT DOCUMENTS

| | | |
|---|---|---|
| JP | H10-279890 | 10/1998 |
| JP | 2012-236899 | 12/2012 |
| WO | 2005-110737 | 11/2005 |
| WO | 2012-152715 | 11/2012 |
| WO | 2015-035556 | 3/2015 |
| WO | 2015-035960 | 3/2015 |
| WO | 2015-195344 | 12/2015 |
| WO | 2016-109418 | 7/2016 |
| WO | 2016-109420 | 7/2016 |
| WO | 2016-168283 | 10/2016 |
| WO | 2016-182803 | 11/2016 |
| WO | 2016-209916 | 12/2016 |
| WO | 2017-030856 | 2/2017 |
| WO | 2017-083289 | 5/2017 |
| WO | 2017-136188 | 8/2017 |
| WO | 2017-136189 | 8/2017 |
| WO | 2017-136219 | 8/2017 |
| WO | 2017-136432 | 8/2017 |
| WO | 2018-039584 | 3/2018 |
| WO | 2018-183195 | 10/2018 |
| WO | 2019-040820 | 2/2019 |

OTHER PUBLICATIONS

Encyclopedia of Polymer Science and Engineering: Poly(phenylene Ether) to Radical Polymerization, Wiley-Interscience Publishers, New York, vol. 13, 1988, 3 pages.

Encyclopedia of Polymer Science and Technology, Plastics, Resins, Rubbers, Fibers Wiley—Interscience Publishers, New York, vol. 16, 1964, 24 pages.

International Search Report for PCT International Application No. PCT/US2018/047939, dated Oct. 22, 2018, 4 pages.

* cited by examiner

ADHESIVE ARTICLES PERMITTING DAMAGE FREE REMOVAL

CROSS REFERENCE TO RELATED APPLICATIONS

This application is a national stage filing under 35 U.S.C. 371 of PCT/US2018/047939, filed Aug. 24, 2018, which claims the benefit of provisional Application No. 62/550,190, filed Aug. 25, 2017, the disclosure of which is incorporated by reference in its/their entirety herein.

RELATED APPLICATION

This application is related to 3M Attorney Case Nos. 62/550,204, 62/622,387, and PCT/US18/47864, each entitled "Adhesive Articles Permitting Damage Free Removal", filed Aug. 25, 2017, Jan. 26, 2018, and Aug. 25, 2018, respectively, and each incorporated by reference in their entirety.

TECHNICAL FIELD

The present disclosure generally relates to peelable adhesive articles that are capable of attaching or adhering to a substrate and that can be removed from the substrate without causing damage to the substrate. The present disclosure also generally relates to methods of making and using such adhesive articles.

BACKGROUND

The revolutionary Command® Adhesive Strip products are a line of stretch removable adhesive strips that hold strongly on a variety of surfaces (including paint, wood, and tile) and that remove cleanly—no holes, marks, or sticky residue. These products generally have utility in bonding to various surfaces or substrates for numerous applications.

In general, these products include a stretch release adhesive composition disposed on tape or other backings. Stretch releasable adhesives are high performance pressure-sensitive adhesives that combine strong holding power with clean removal and no surface damage. Stretch releasable adhesive products are designed to firmly adhere an article, such as a hook (to hold a picture or an article of clothing) or other decorative or utilitarian element, to a surface (an adherend), yet remove cleanly when pulled away from the architectural surface at a low angle. The clean removal aspect means that a tacky and/or unsightly residue is not left behind on the surface after removal of the stretch release adhesive and that no damage to the surface occurs during the removal process. During the process of stretch release removal, the adhesive layer typically remains adhered to the tape backing as the backing is stretched, but releases from the surface (adherend).

Peelable adhesive technology was recently introduced into products for mounting. Some exemplary commercially available peelable mounting products (e.g., Jimmy Hook™ products, GeckoTech™ products, Elmer's Freestyle™ products, and Hook Um™ products) rely on both suction technology and frictional or dry adhesives to generate the mounting device's holding power. The mounting devices include a semi-rigid plastic backing and a rigid hook, both of which are integrated as a one-piece article support. The rigid hook is permanently attached to a first major planar surface of the semi-rigid plastic backing. The second major planar surface of the backing can be adhered to a wall surface. The second major planar surface includes one or more of suction technology (e.g., numerous microsuction or nanosuction elements) and/or a frictional adhesive (in which the backing is impregnated with a rubber-based adhesive to increase friction between the substrate and backing) or dry adhesive (which relies on van der Waals forces). The entire construction can, thereafter, be removed by peeling.

SUMMARY

Existing peelable adhesive products often do not work well on various surfaces, including, for example, painted surfaces and rough surfaces (e.g., drywall). Additionally, the existing peelable products can have low shear strength and thus can hold little weight or alternatively require a large adhesive surface area/thickness, which can cause an increase in the potential for damage when such products are removed from an adherend. Attempts have been made to replace existing backings with those having lower stiffness (modulus) to reduce the peel force upon removal. Soft, elastic backings, for example, have been shown to result in lower peel forces which correlate with appreciable stretch (strain) of the adhesive at release. Even with advantageous modifications to the backing materials, the present inventors recognized that certain delicate surfaces (e.g., paper and drywall) still experienced visible damage, particularly under circumstances in which the ability of the backing to stretch is compromised. As such, the inventors of the present disclosure sought to formulate peelable mounting products and/or adhesive articles with at least one of higher shear strength, that work well on painted or rough surfaces, and/or that are capable of consistently holding higher weights, all without damaging the substrate to which they are applied.

The inventors of the present disclosure recognized that the existing peel release adhesive products could be improved or enhanced by reducing or eliminating the contribution of the backing to peel force generated by the adhesive during removal. In some instances, this can be accomplished by ensuring the core loses structural integrity in a direction normal to a plane defined by a major surface thereof. In other instances, the contribution is reduced by compromising the interface between the backing and a peelable adhesive layer. By separating the peel force from the characteristics of the backing, the adhesive articles of the present disclosure can capitalize on myriad backing materials and constructions without deleteriously impacting damage free removability. In some instances, the enhanced construction allows the adhesive articles to hold more weight. In some embodiments, the enhanced removability permits the adhesive articles to be used on new surfaces (e.g., delicate paper). In some embodiments, the enhanced conformability increases or enhances the product performance on certain surfaces (e.g., rough or textured surfaces such as, for example, wallpaper, drywall, etc.).

The inventors of the present disclosure also recognized that providing a backing that minimally contributes to the peel release force during the removal process is a novel and effective method to increase performance of the adhesive article while enhancing the damage-free features of the product.

In one aspect, the present disclosure provides an adhesive article comprising a first peelable adhesive layer, a second peelable adhesive layer, and a discrete core disposed between the first and second peelable adhesives and defining a core plane. Either peelable adhesive layer debonds from the core when the adhesive article is removed at an angle of greater than 35 degrees.

In one aspect, the present disclosure provides an adhesive article comprising: a first peelable adhesive layer; a second peelable adhesive layer, a discrete core disposed between the first and second peelable adhesives, and having first and second major surfaces, wherein the core defines a core plane coincident with the first major surface; and a plurality of adhesive contact areas each comprising an interface between the first and second adhesive layers.

In another aspect, the present disclosure provides an adhesive article for mounting an object to a surface, the article comprising: a first adhesive layer, a second adhesive layer, a core defining a perimeter, the core disposed between the first adhesive layer and the second adhesive layer, and a plurality of adhesive contact areas, wherein the adhesive contact areas comprise an interface between the first and second adhesive layers, and wherein the adhesive contact areas are located within the perimeter of the core.

In another aspect, the present disclosure provides an object for mounting to a surface, the object comprising: a hardgood having a first major surface; a discrete core defining a first surface in contact with the hardgood and a second surface opposing the first surface; and an adhesive layer bonded to both the first major surface of the hardgood and the second surface of the core, wherein the peel release force necessary to remove the adhesive from the hardgood is greater than at least one of the peel release force necessary to debond the adhesive from the core or the peel force necessary to delaminate the core.

In another aspect, the present disclosure provides a method of using an adhesive article, comprising: contacting any of the adhesive articles described herein with an adherend surface.

As used herein. "layer" means a single stratum that may be continuous or discontinuous over a surface.

As used herein, the terms. "height", "depth", "top" and "bottom" are for illustrative purposes only, and do not necessarily define the orientation or the relationship between the surface and the intrusive feature. Accordingly, the terms "height" and "depth", as well as "top" and "bottom" should be considered interchangeable.

The terms "comprises" and variations thereof do not have a limiting meaning where these terms appear in the description and claims.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As recited herein, all numbers should be considered modified by the term "about".

As used herein, "a," "an," "the," "at least one," and "one or more" are used interchangeably. Thus, for example, a core comprising "a" pattern of recesses can be interpreted as a core comprising "one or more" patterns.

Also herein, the recitations of numerical ranges by endpoints include all numbers subsumed within that range (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

The above summary of the present disclosure is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exhaustive list.

Layers in certain depicted embodiments are for illustrative purposes only and are not intended to absolutely define the thickness, relative or otherwise, or the absolute location of any component. While the above-identified figures set forth several embodiments of the disclosure other embodiments are also contemplated, as noted in the description. In all cases, this disclosure is presented by way of representation and not limitation. It should be understood that numerous other modifications and embodiments can be devised by those skilled in the art, which fall within the scope and spirit of the principles of the disclosure.

DETAILED DESCRIPTION

Various embodiments and implementations will be described in detail. These embodiments should not be construed as limiting the scope of the present application in any manner, and changes and modifications may be made without departing from the spirit and scope of the inventions. Further, only some end uses have been discussed herein, but end uses not specifically described herein are included within the scope of the present application. As such, the scope of the present application should be determined by the claims.

The present disclosure generally relates to adhesive articles that can be removed from a substrate, wall, or surface (generally, an adherend) without damage. As used herein, the terms "without damage" and "damage-free" or the like means the adhesive article can be separated from the substrate without causing visible damage to paints, coatings, resins, coverings, or the underlying substrate and/or leaving behind residue. Visible damage to the substrates can be in the form of, for example, scratching, tearing, delaminating, breaking, crumbling, straining, and the like to any layers of the substrate. Visible damage can also be discoloration, weakening, changes in gloss, changes in haze, or other changes in appearance of the substrate.

The adhesive article includes (1) one or more peelable adhesive layers adjacent to (2) a discrete core. As used herein, the term "peelable" means that the adhesive article can be removed from a substrate or surface by peeling at angle of between about 1" and about 180". In some embodiments, the adhesive article can be removed from a substrate or surface by peeling at angle of between 30" to 120". In some embodiments, the adhesive article can be removed from a substrate or surface by peeling at angle of at least about 35°. During peel release removal, at least a first adhesive layer detaches from or deforms the core. The adhesive articles are thus specifically designed to mimic a "backingless" construction, where the core has little to no contribution to adhesive removal forces experienced by the adherend. The "backingless" construction provides an adhesive article with a peel force that does not exceed the damage threshold on substrates including, for example, drywall, paint, glass, etc.

Figure 1:
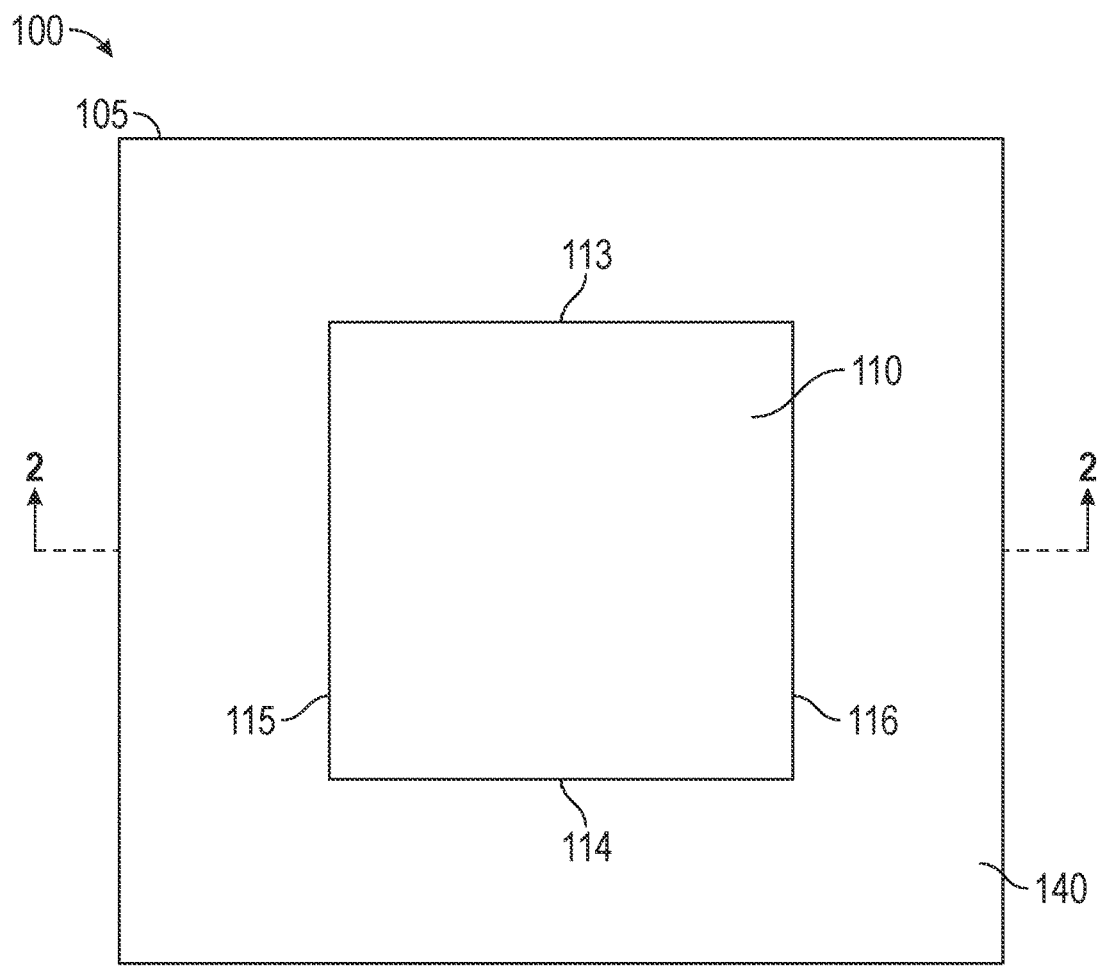
FIG. 1 is a top plan view of one embodiment of an exemplary adhesive article of the type generally described herein.
Figure 2:
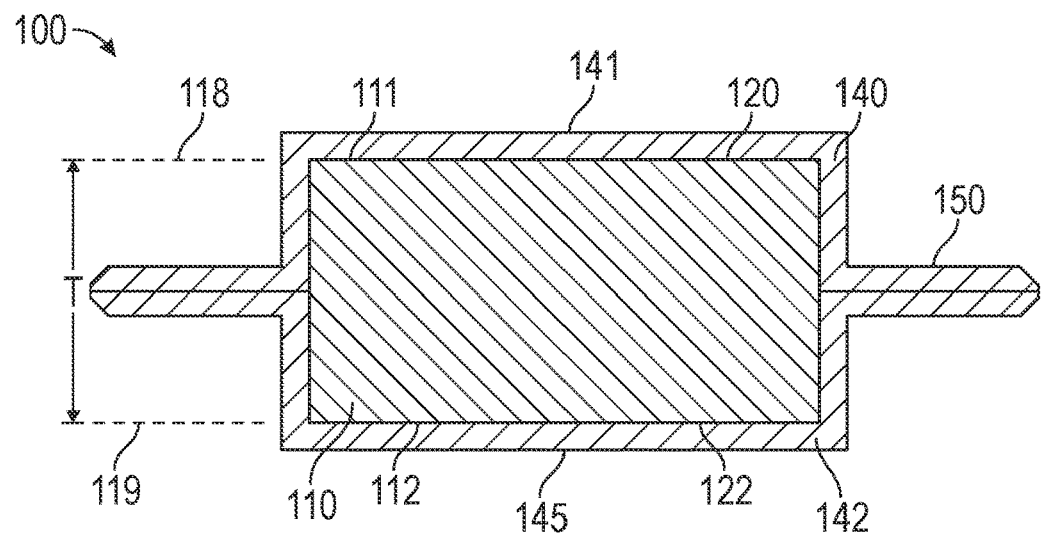
FIG. 2 is a cross-sectional view of the adhesive article of FIG. 2.

FIGS. 1 and 2 depict an exemplary embodiment of an adhesive article 100 as generally described herein. The adhesive article 100 includes a core 110 having first and second opposed major surfaces 111 and 112. FIG. 1 depicts the adhesive article 100 in top plan view, with the core 110 visible through an adhesive layer 140. In some embodiments, the adhesive 140 can be generally optically clear such that the core is at least partially visible. In other embodiments, the adhesive layer 140 can be generally opaque or the core may be otherwise not visually identifiable in top plan view. As seen in FIG. 2, the core 110 has a square shape defined by an upper edge 113, a lower edge 114, and side edges 115, 116. The shape of the core 110 is not particularly limited, and can include any suitable shape or combination of shapes. The edges 113-116 cooperate to form a core perimeter 117, which defines an identifiable boundary between the core and the remainder of the adhesive article 110 (e.g., adhesive layer 140).

The core 110 exists as a distinct structural component of adhesive article 100 and not as material dispersed or otherwise distributed in one or both adhesive layers 140, 142. Materials forming core 110 can include a paper, natural or synthetic polymer films, nonwovens made from natural and/or synthetic fibers and combinations thereof, fabric reinforced polymer films, fiber or yarn reinforced polymer films or nonwovens, fabrics such as woven fabric formed of threads of synthetic or natural materials such as cotton, nylon, rayon, glass, ceramic materials, and the like, or combinations of any of these materials. The core 110 may also be formed of metal, metallized polymer films, or ceramic sheet materials. In some embodiments, the core is a multilayered film having two or more layers; in some such embodiments the layers are laminated. For example, the core can be formed of a foam, a film, or a combination thereof with any suitable thickness, composition, and opaqueness or clarity. In other embodiments, the core may include an arrangement of discrete particles or an adhesive or other composition having relatively high gel content. Exemplary materials and constructions for the core 110 are explored in further detail below. Combinations of two or more such compositions and constructions are also useful in various embodiments of the present disclosure.

In the specific embodiment of FIGS. 1 & 2, the core 110 includes a single core layer of material having a thickness "T", though multilayer or multi-material constructions are also contemplated and described herein. In some embodiments, the core has a thickness "T" of between about 2 mils and about 100 mils. In some embodiments, the core has a thickness of greater than 2 mils, greater than 5 mils, greater than 8 mils, greater than 10 mils, greater than 12 mils, greater than 15 mils, greater than 20 mils, greater than 22 mils, or greater than 24 mils. In some embodiments, the core has a thickness of less than 100 mils, less than 90 mils, less than 80 mils, less than 75 mils, less than 70 mils, less than 65 mils, less than 60 mils, less than 55 mils, less than 50 mils, less than 45 mils, less than 40 mils, less than 38 mils, less than 35 mils, less than 32 mils, less than 30 mils, less than 28 mils, or less than 25 mils.

The adhesive layer 140 extends along each side of the perimeter 117, effectively surrounding the core 110 and defining the boundary 105 of the adhesive article 100. The adhesive layer 140 as depicted in FIG. 1 features essentially the same square shape as the core 110. In other embodiments, the adhesive layer 140 can instead define, for example, a rectangular, elliptical, or ovular shape. In other embodiments, the adhesive layer 140 extends along only the side edges 115, 116 or only the upper and lower edges of the core 110. In yet other embodiments, the adhesive layer 140 extends partially along a single edge, or partially along multiple edges.

As depicted in of FIG. 2, the core 110 is generally rectangular in cross-section, however the core may have a variety of cross-sectional shapes. For example, the cross-sectional shape of the core 110 may be a polygon (e.g., square, tetrahedron, rhombus, trapezoid), which may be a regular polygon or not, or the cross-sectional shape of the core 110 can be curved (e.g., round or elliptical). A first core plane 118 is coincident with the first major surface 111, while a second core plane 119 is coincident with the second major surface 112. The core planes 118, 119 are depicted in parallel, but may intersect and form an oblique angle in other embodiments.

Each of the major surfaces 111, 112 are adjacent to peelable adhesive layers 140 and 142. Peelable adhesive layers 140 and 142 can be the same as one another or different from one another. Adhesive layers 140 and 142 can each be a single layer or can be multilayer. Adhesive layers 140 and 142 can each be continuous or discontinuous (e.g., patterned) across the major surfaces of the core 110. Each of adhesive layers 140 and 142 include opposed major surfaces 141, 145, respectively. An available adhesive area for the article is defined by the length and width of the opposed major surfaces 141, 145 of each adhesive layer (here larger than the first major surface 111 of the core 110). The available adhesive areas of the major surfaces 141, 145 are used to couple the adhesive article 100 to, for example, a wall surface or a hardgood.

The portions of adhesive layers 140 and 142 that are coextensive with the major surfaces 111, 112 of the core are separated by the thickness "T". The core 110 is thus discrete from the adhesive layers 140, 142 and includes a defined and identifiable geometry, as described above. The thickness of the adhesive layer(s) is not particularly limited, but is typically substantially continuous across at least the major surfaces of the core. In presently preferred implementations, the thickness of the adhesive layer is no greater than 95% of the core thickness "T", no greater than 90%, no greater than 80%, no greater than 75%, no greater than 60%, no greater than 50%, no greater than 40%, no greater than 30%, no greater than 20%, and in some embodiments no greater than 10% of the core thickness "T". In typical embodiments, one or both adhesive layers 140, 142 have a thickness of between about 1 mil and about 3 mils.

In certain implementations, the thickness of a given adhesive layer 140, 142 on the major surfaces of the core 110 can be greater than the combined thickness of the adhesive layers at an adhesive interface 150, as described below.

Contact between the first adhesive layer and the first major surface 111 of the core defines a first core interface 120. Similarly, contact between the second adhesive layer 142 and second major surface 112 defines a second core interface 122 opposing the first core interface 120. In some embodiments, the first and second interfaces 120, 122 include an area of adhesive contact with the core of at least about 5%; at least about 10%, at least about 25%; at least about 30%; at least about 35%; at least about 40%; at least about 45%; at least about 50%; at least about 55% at least about 60% at least about 65%; at least about 70%; at least about 75%; or at least about 800%. In some embodiments, the first and second core interfaces include an area of adhesive contact between the adhesive layer 140, 142 and the core of between about 10% and about 100% In some embodiments, the first and second core interfaces 120, 122 include an area of adhesive contact between the adhesive layer 140, 142 and the core of between about 40% and about 90%. The area of adhesive contact for each core interface 140, 142 may be the same or different. In some embodiments, including those with a hardgood mounted to the first peelable adhesive layer 140, the area of adhesive contact at the first core interface 140 is greater than the area of adhesive contact at the second core interface 142. In other embodiments, the second the area of adhesive contact at the second core interface 142 is greater than the area of adhesive contact at the second core interface 140.

Major surfaces of the adhesive layers 140, 142 that are not displaced by the core 110 are bonded together to form an adhesive interface 150. In the embodiment depicted in FIGS. 1 and 2, the adhesive interfaces 150 define a seam surrounding the perimeter of core 110. The adhesive interfaces 150 rests in a plane generally parallel to the core planes 118, 119, but can be coplanar with either core plane 118, 119 in other implementations.

The materials making up the core 110 and adhesive layers 140, 142 are selected so that the bond at the adhesive interface 150 is stronger than: 1) the bond strength at or near the first and/or second core interfaces 120, 122; 2) the structural integrity (e.g., cohesive strength) of the core 110 in a direction substantially perpendicular to the core plane 118; or 3) combination thereof. The bond at the adhesive interface 150 may be cohesive (in embodiments featuring the same peelable adhesive in adhesive layers 140, 142), adhesive, or combinations thereof.

The relationship between the core interface and the adhesive interface can be expressed as a Peel Ratio, which is defined as the peel strength ($oz/in^2$) at the adhesive interfaces compared to the peel strength at the core interface(s). In some embodiments, the Peel Ratio can be at least 1.15:1; in some embodiments at least 1.25:1; in some embodiments at least 1.5:1; in some embodiments at least 2:1; in some embodiments at least 3:1; in some embodiments at least 5:1; in some embodiments at least 10:1; in some embodiments at least 15:1; in some embodiments at least 20:1.

In certain embodiments, the material for the core 110 is selected so that it forms a relative weak bond with either or both adhesive layers 140, 142.

Alternatively, one or both major surfaces 111, 112 of the core 110 may include a release material to reduce or minimize the bond strength at the core interface. Suitable release materials include, but are not limited to, low surface energy materials such as silicones, epoxy silicones cured by photoacid generated crosslinking, fluorosilicones, silicone acrylates, perfluoropolyether and other fluorochemical materials, olefin materials, long-chain hydrocarbon-functional materials, and copolymers and mixtures thereof. In other embodiments, a deadening layer is applied over at portion of the core interface. The deadening material decreases or eliminates the adhesiveness of the adhesive at the core interface. Exemplary deadening materials include, for example, glass bubbles, a film, a clear ink, a liquor, and/or an adhesive with lower adhesion properties. In some embodiments, an adhesive in the core interface is treated in a way that decreases or eliminates its adhesiveness. Some exemplary treatments include, for example, radiation. UV exposure, e-beam, or other means to crosslink or detackify the adhesive.

In other embodiments, the material or construction of the core is selected so that it delaminates, fails cohesively, or otherwise separates upon application of force generated on the adhesive article during removal.

Even in embodiments featuring a destructible core, the core 110 can still provide sufficient strength along the general plane of its separation so that, depending on the specific application, the structural integrity of the core will not fail based on the use of the adhesive article 100 for mounting an object on a mounting surface. The core 110 can advantageously provide an internal static shear strength in a direction parallel to the core planes 118, 119 sufficient for supporting an object and providing a level of resiliency to the article 100.

Figure 3A:
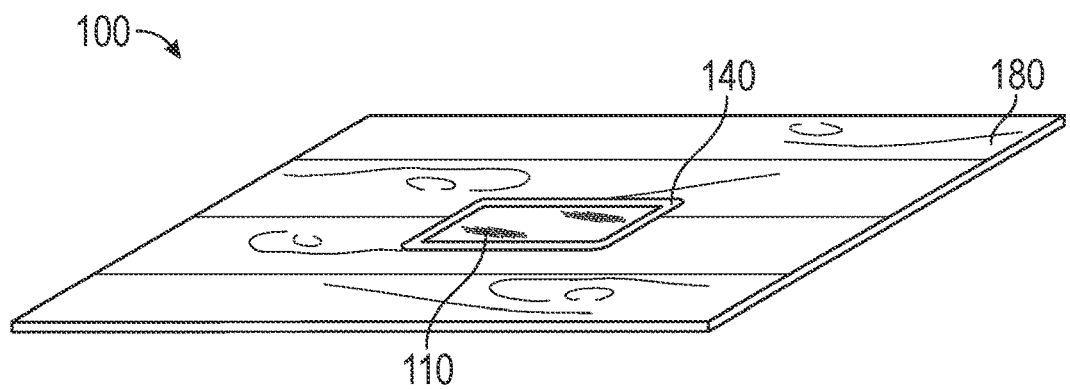
FIGS. 3A-3C are photographs of an adhesive article generally of the type identified in FIGS. 1 & 2 being removed from the surface of an adherend.
Figure 3B:
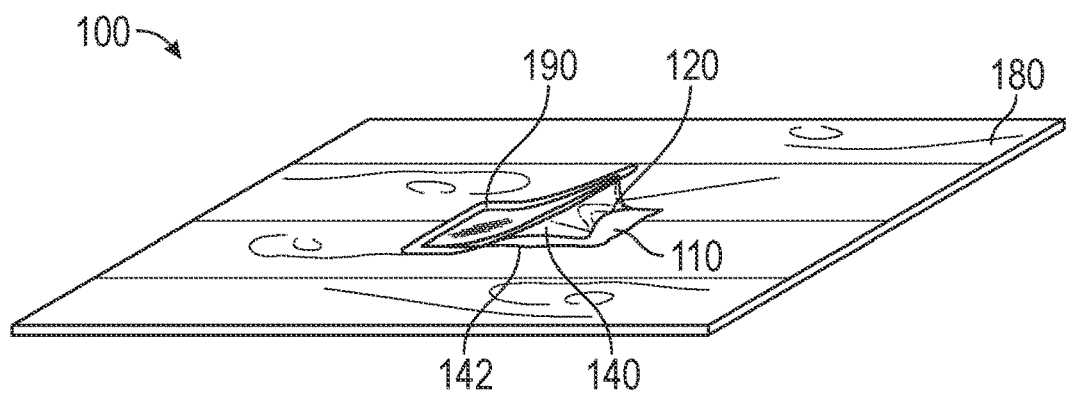
Figure 3C:
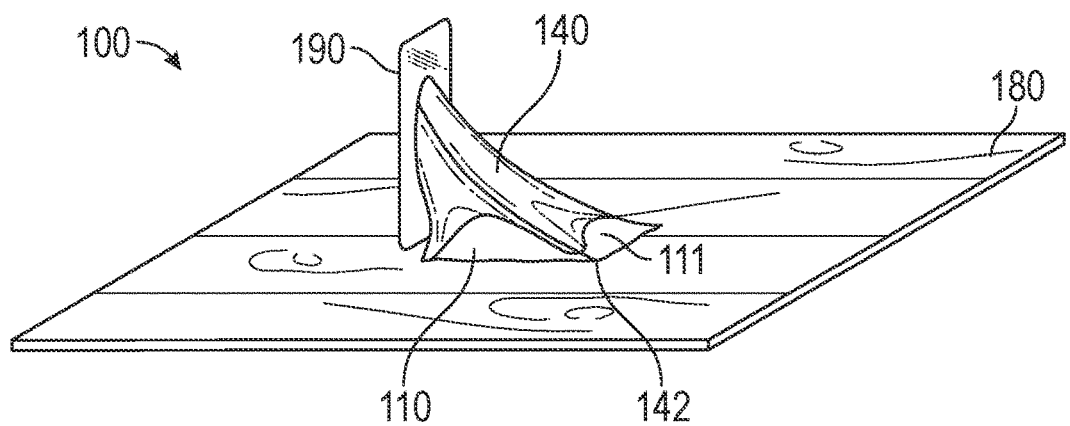

FIGS. 3A-3C depict the removal of an article 100 positioned between a hard film 190 and an adherend 180. As depicted in FIGS. 3A-3C, when the article 100 is removed from the adherend at a peel angle exceeding 35 degrees, the adhesive layer 140 decouples from at least a portion of the bulk of core 110. This can occur due to an adhesive bond failure at the first core interface 120, or can occur due to degradation (e.g., cohesive failure or delamination) of the core material at the first major surface 111 or otherwise within the body of core 110. For example and as shown in FIGS. 3B and 3C, if the core 110 includes a nonwoven material, the peel removal force may cause fibers or filaments in the nonwoven material at the core interface to become dislodged from the remainder of the core 110 or cause the destruction of the core 110 in the general direction of the core thickness (i.e., in a direction substantially perpendicular to one or both the core planes 118, 119 (not shown in FIGS. 3A-3C)). Without wishing to be bound by theory, the debonding or degradation at one or both of the core interfaces serves to at least reduce or potentially eliminate the contribution of the core 110 to the peel force, allowing the adhesive layer(s) to stretch independently and reduce potential damage to the adherend. In some embodiments, the aggressiveness of the peelable adhesive layer(s) 140, 142 can be chosen so that the core separation or degradation occurs prior to delamination of the adhesive interfaces 150 (not shown in FIGS. 3A-3C) or to separation of the bond between the requisite peelable adhesive layer and an adherend or hardgood.

Figure 4:
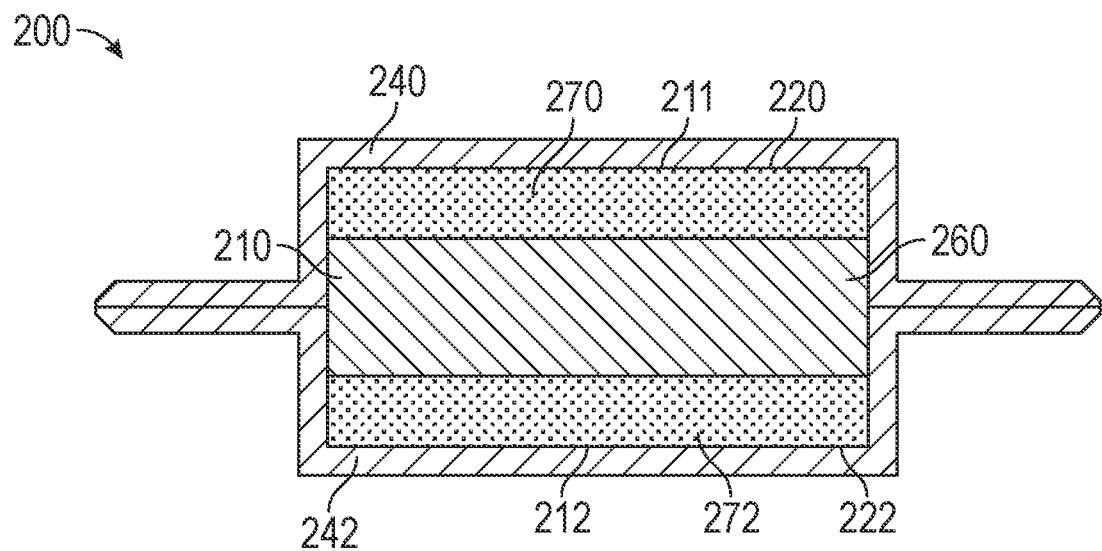
FIG. 4 is a cross-sectional view of one embodiment of an exemplary adhesive article of the type generally described herein.

FIG. 4 depicts another embodiment of an adhesive article 200 according to the present disclosure. Like adhesive article 100 of FIGS. 1-2, the adhesive article 200 includes a core 210, a first peelable adhesive layer 240 and a second peelable adhesive layer 242. The core 210 includes first and second major surfaces 211, 212 adjacent to first and second adhesive layers 240, 242. Contact between the first adhesive layer 240 and the first major surface 211 of the core defines a first core interface 220. Similarly, contact between the second adhesive layer 242 and second major surface 212 defines a second core interface 222 opposing the first core interface 220. Article 200 differs from adhesive article 100 in that article 200 includes a multilayer core 210.

Multilayer core 210 may include a backing 260 and one or more skin layers 270 coupled to or otherwise disposed on opposed major surfaces of the backing 260. As depicted, the multilayer core includes two skin layers 270 and 272. In certain embodiments, the backing 260 is a stretchable film layer. For example, the backing 260 can be in the form of a foam, a film or a combination thereof with any suitable thickness, composition, and opaqueness or clarity. The backing 260 can be a single layer of film, a single layer of foam, multiple layers of film, multiple layers of foam, multiple layers of foam and film, and/or single or multiple layers of adhesive. In particular embodiments, the core 210 includes the multilayer films as described in PCT Application No. US2017/016039 (Runge et al.), incorporated herein by reference in its entirety. Skin layers 270 and 272 can be the same as one another or different from one another. Each of the layers within skin layers 270, 272 can be a single layer or can be multilayer.

In certain embodiments, the backing 260 includes a material having a substantially higher stiffness or modulus than either or both skin layers 270, 272. The use of a stiffer backing 260 can provide structural support to the core 210 to e.g., improve shear holding behavior, and may also be selected to influence removal characteristics such as peel removal angle and peel removal rate. In some embodiments, the high stiffness region has a stiffness that is at least about 5% greater than the stiffness in a low stiffness region of the adhesive mounting assembly. The stiffness of the backing 260 (or any layer described herein) is defined by the combination of thickness and Young's modulus. Exemplary Young's Modulus's of backings described herein are between about 100 PSI and about 15,000 PSI. As used herein, the term "high stiffness" refers to a layer or arrangement of material having a stiffness that is at least about 5% greater than a skin layer. In some embodiments, the high stiffness backing 260 has a stiffness that is between about 5% and about 10,000% greater than the stiffness in a skin layer. In some embodiments, the high stiffness region has a stiffness that is at least 50% greater, at least 100% greater, and in some embodiments a least 1000% greater than the stiffness in either or both skin layers 270, 272. In some embodiments, the backing 260 has a Young's modulus of between about 660 PSI and about 2000 PSI. In some embodiments, the skin layer(s) 270, 272 have a Young's modulus of between about 600 PSI to about 1500 PSI. In another embodiment, the high stiffness skin layer 270, 272 has a stiffness that is between about 5% and about 10,000% greater than the stiffness in the backing 260.

Figure 5:
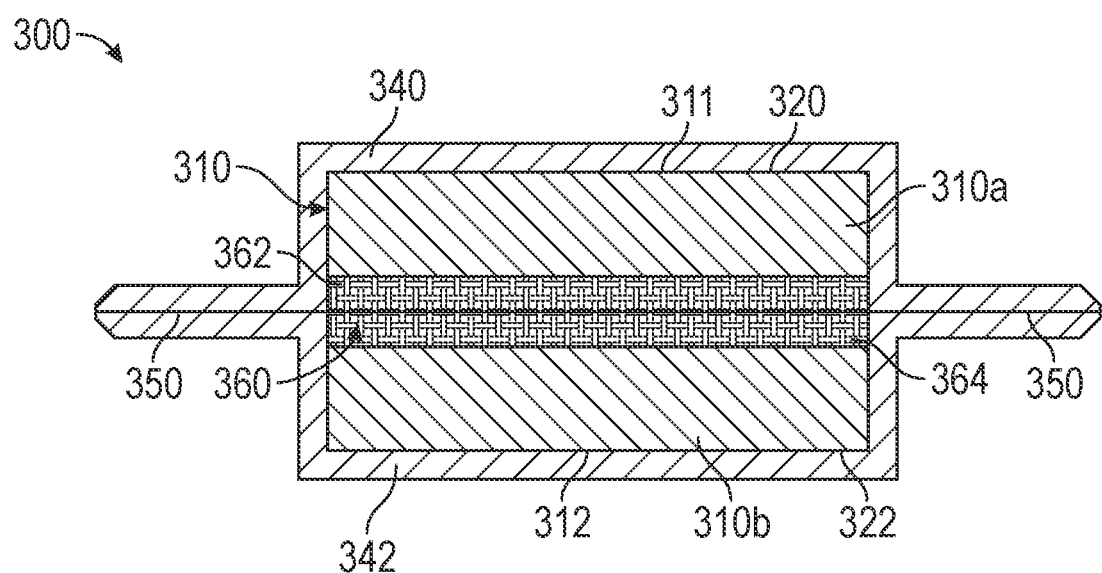
FIG. 5 is a cross-sectional view of one embodiment of an exemplary adhesive article of the type generally described herein.

FIG. 5 depicts another embodiment of an adhesive article 300 according to the present disclosure, featuring a core 310 designed for internal separation upon removal of the article 300 from an adherend. Like adhesive articles 100 and 200, the adhesive article 300 includes a core 310, a first peelable adhesive layer 340 and a second peelable adhesive layer 342. The core 310 includes first and second major surfaces 311, 312 adjacent to the first and second adhesive layers 340, 342. Contact between the first adhesive layer 340 and the first major surface 311 of the core defines a first core interface 320. Similarly, contact between the second adhesive layer 342 and second major surface 312 defines a second core interface 322 opposing the first core interface 320. The core 310 includes a separable connector 360 between first and second backing layers 310a, 310b. The separable connector 360 includes a first separable connecting member 362 disposed on the second major surface of the first backing layer 310a, and a second separable connecting member 364 disposed on the second major surface of second backing layer 310b. The first and second separable connecting members 362 and 364 are engageable with each other to form a separable connection, thereby detachably connecting the core backing layers: the flexible the first separable connecting member 362 remains with the first core backing 310a and the second separable connecting member 364 remains with the second core backing 310b after separation of the separable connector 360.

The separable connector 360 can include any known or developed reusable connector for connecting the core backing layers. The separable connector 360 permits the separation and connection of the first and second core backing layers 310a. 310b along a general plane. In some embodiments, the separable connector 360 can include, for example, a mechanical type fastener including an interlocking system, an intermeshing system having connection without macroscopic mechanical deformation or interference, a releasable contact responsive fastener, a splittable construction, and the like. In other embodiments, the separable connector 360 includes one or more layers of an adhesive, gel, or gel adhesive bound by covalent bonding, ionic bonding, hydrogen bonding, and/or van der Waals forces.

In some embodiments, the first separable connecting member 362 can include a layer of hook material which is bonded with the first core backing layer 310a at a second major surface thereof, and the second separable connecting member 364 can include a layer of loop material which is bonded with the second core backing 310b at a second major surface thereof. It is contemplated that any commercially available hook and loop connector system, including those available from 3M Company, can be utilized. Hook and loop connector systems are but one type of mechanical interlocking connector systems which are suggested by this embodiment. By mechanical interlocking, it is meant those fasteners where at least one of the connector elements undergoes some macroscopic deformation (preferably plastic deformation) so that a mechanical interference results between plural components. Many different modifications of the inter-engaging elements are designed based on the requisite force and manner of separation between the cooperating layers of such a separable connector system. Some exemplary separable connectors are described in, for example, U.S. Pat. Nos. 6,572,945; 7,781,056; 6,403,206; and 6,972,141, all of which are incorporated by reference in their entirety herein.

The area of connection and the type of the separable connector 360 can be selected so that the force required to separate the core backing layers 310a, 310b is substantially lower than that required to remove the peel adhesive layer from an adherend or rupture the bond at an adhesive interface 350. Such a force may be applied in a direction substantially perpendicular to the general plane of the connector 360. In some embodiments, the separable connecting members 362, 364 can be chosen so that the separable connector 360 separates, compromising the structural integrity of the core 310, prior to delamination of the adhesive interface 350 or to separation of the bond between the peelable adhesive layer and the adherend.

Under certain circumstances, the separable connector can be reconstituted for reuse even after separation during peel removal. For example, separable connecting member 362, 364 can be realigned and pressure applied across a major surface to cause another mechanical interlocking. As another example, a separable connector featuring one or more layers of adhesive and/or gel can allow for one or more of the bonds (e.g., ionic. Van der Waals) to reform.

The separable connector 360 can provide sufficient strength along the general plane of its separation so that, depending on the specific application, the separable connector 360 will not separate based on the use of the adhesive article for mounting an object on a mounting surface. The separable connector 360 can provide an internal static shear strength in a direction parallel to the general plane for supporting the mounted object (e.g., a hardgood).

Figure 6:
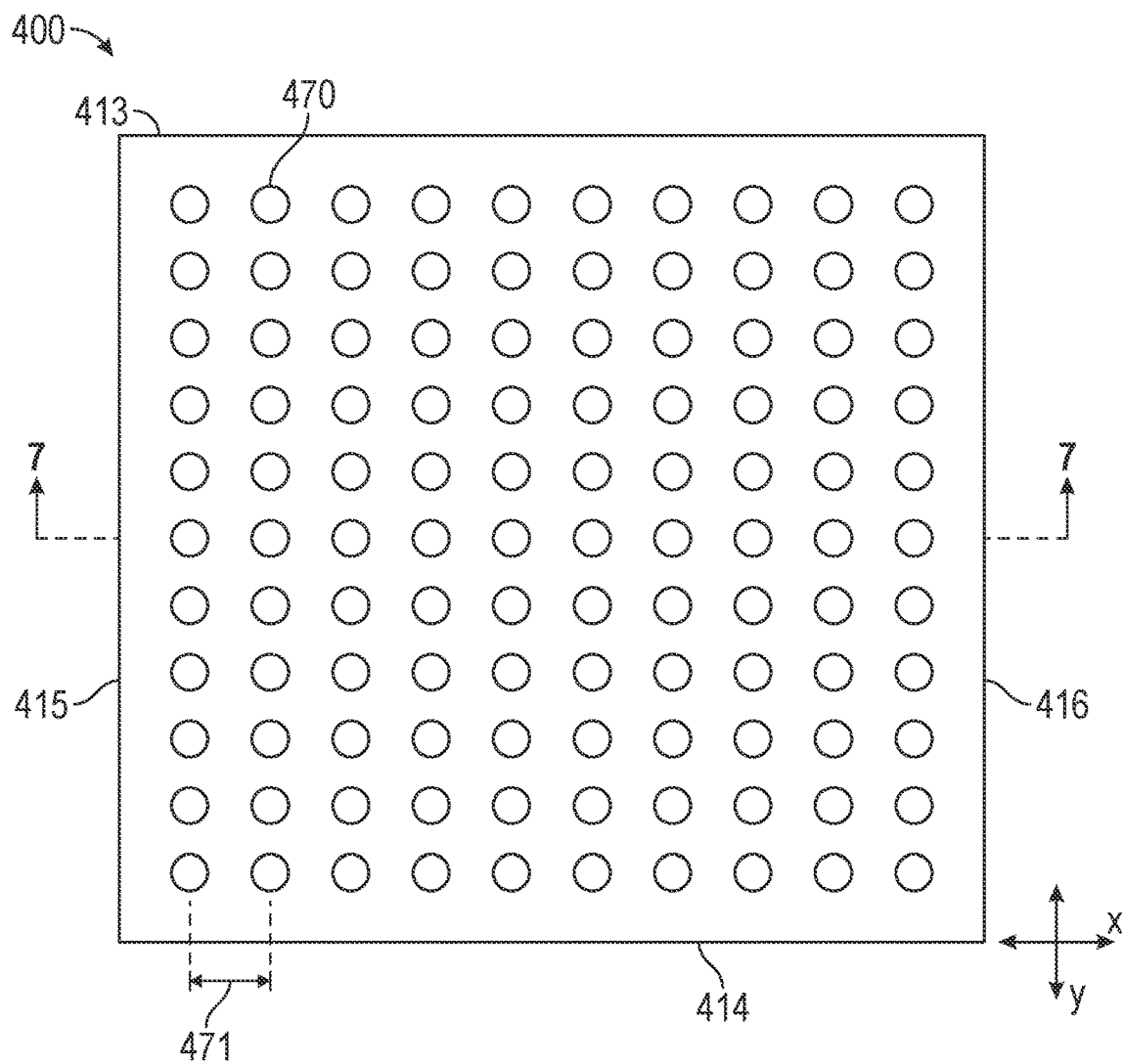
FIG. 6 is a top plan view of one embodiment of an exemplary adhesive article of the type generally described herein.
Figure 7:
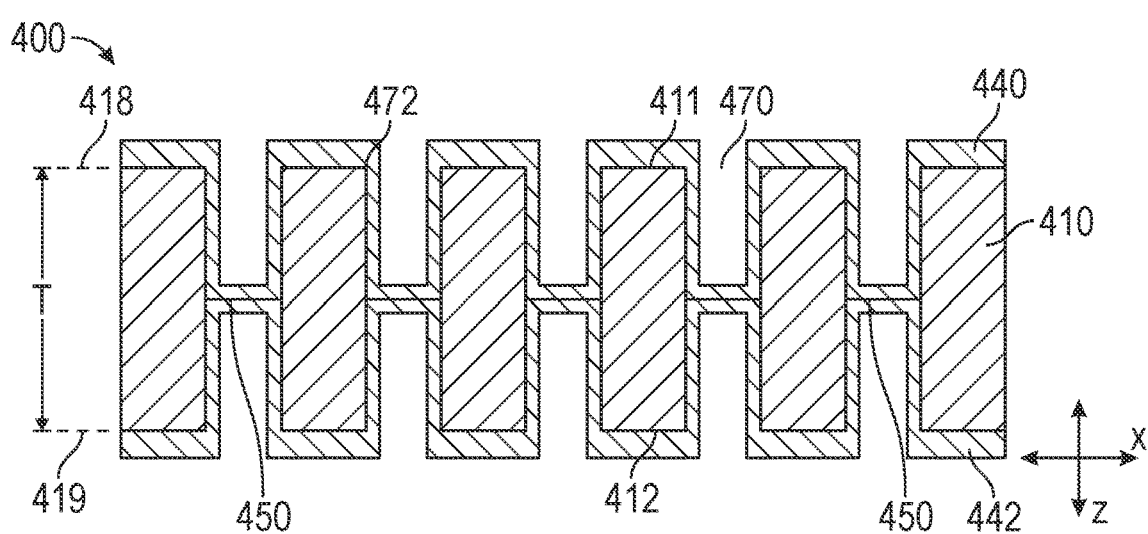
FIG. 7 is a cross-sectional view of the adhesive article of FIG. 6.

An adhesive article according to another embodiment of the present disclosure is depicted in FIGS. 6 & 7. The adhesive article 400 includes an adhesive layer 440 that is coextensive with a core 410. The core includes a first major surface 411, with upper edge 413, lower edge 414, and side edges 415, 416 cooperating to form a perimeter. The core 410 includes an array of apertures 470 extending through the thickness "T" of the core material. In some embodiments, the core 410 includes an arranged pattern of apertures 470. An "arranged pattern" is a plurality of features (e.g., apertures, recesses, channels, etc.) arranged at predetermined positions, arranged with some degree of regularity, or arranged in any desired manner. The apertures 470 in core 410 are arranged in a grid array, but other patterns and arrangements are possible. In some embodiments, the apertures 470 are distributed as a periodic array across a core surface (e.g., a one-dimensional array or a two-dimensional array, for example a square array, hexagonal, or other regular array). For example, the arranged pattern of apertures can include an arranged row pattern, an arranged lattice pattern such as an arranged square lattice pattern an arranged zigzag pattern, or an arranged radial pattern. The arranged pattern need not be formed evenly on the entire surface but may be formed in only a portion of the core surface. The pattern of apertures may vary or remain the same over any portion of the article. For example, similar or different patterns can be used within the same plane. The apertures within the pattern can be of similar size and shape or can have different sizes and shapes.

A Cartesian x-y-z coordinate system is included in FIGS. 6 & 7 for reference purposes. The first and second major surfaces 411, 412 extend generally parallel to the x-y plane, and the thickness of the core 410 corresponds to the z-axis. The array of apertures 470 includes a transverse direction, generally along the x-axis and a longitudinal direction, generally along the y-axis. The pitch between adjacent apertures 470 in an array or pattern may be the same in both the transverse direction and longitudinal direction. The arranged pattern includes a defined spacing or pitch between adjacent apertures 470. The configuration of apertures in any given region can be chosen so that the pitch 471 (i.e., the average centroid to centroid distance between adjacent features) is at least 0.5 millimeters, in other embodiments at least 1 millimeter, in other embodiments at least 5 millimeters, in other embodiments at least 15 millimeters, in other embodiments at least 20 millimeters, in other embodiments at least 25 millimeters, and in yet other embodiments at least 30 millimeters. In certain embodiments, the pitch is no greater than 70 millimeters, in some embodiments no greater than 60 millimeters, in some embodiments no greater than 50 millimeters, and in certain embodiments no greater than 45 millimeters.

The apertures 470 can take the form of any shape. The illustrated embodiment of the core 410 comprises a plurality of circular openings 472. Non-limiting examples of shapes that are suitable for aperture openings 472 include circles, triangles, squares, rectangles, and other polygons. Similarly, the three-dimensional geometry of the apertures 470 is not particularly limited so long as the aperture extends through the core 410 and can include circular cylindrical, elliptical cylindrical; cuboidal, e.g., square cube or rectangular cuboid, conical: truncated conical and the like. Regardless of cross-sectional shape, each aperture 470 comprises a largest cross-sectional dimension at the opening 472. The size of the largest cross-sectional dimension is not particularly limited. The largest cross-section can be, in exemplary embodiments, no greater than 80 millimeters, in some embodiments no greater than 70 millimeters, and in some embodiments no greater than 60 millimeters. The largest cross-sectional dimension may be at least 0.5 millimeters, in other embodiments at least 1 millimeter, in other embodiments at least 5 millimeters, in some embodiments at least 10 millimeters, in some embodiments at least 15 millimeters, and in some embodiments at least 20 millimeters.

As depicted, the apertures 470 are discrete along both the transverse and longitudinal directions. In other embodiments, the apertures 470 can be discrete along one direction, such that the apertures resemble channels in the core, or may extend diagonally (relative to the orientation shown in FIG. 6) across the major surfaces 411, 412 of the core. Such channels can follow any desired path and can be continuous across a surface of the core in a given direction or discontinuous.

The adhesive layers 440, 442 contact to form a plurality of adhesive interfaces 450 within the volume of the apertures 470. As depicted in FIG. 7, each aperture 470 in a line of the array includes an adhesive interface 450. Though a one-to-one ratio of aperture to interface may be preferred in certain circumstances, other embodiments of the present disclosure may include an adhesive interface 450 in less than all available apertures 470. In other embodiments, the adhesive layers may not create an adhesive interface in any of the apertures 470.

The first and second peelable adhesive layers 440, 442 are depicted in FIGS. 6 and 7 as covering the interstitial space on the majors surfaces 411, 412 of core between apertures 470. In other embodiments, the adhesive layers can cover a less than continuous portion of the interstitial space, or may cover only the interstitial space immediate surrounding the opening or base of the aperture 470. In yet other embodiments, one or both adhesive layers exist only within the aperture 470, such that both a core interface and adhesive interface are located within the volume of an aperture. In typical embodiments, the adhesive layers 440, 442 do not occupy all available volume within a given aperture.

The plurality of adhesive interfaces 450 exists within the perimeter of the core 410 and in a plane generally parallel to and offset from the first and second core planes 418, 419. The core 410 of article 400 may be combined with features of the adhesive articles 100-300 in other implementations, such that articles include adhesive interfaces both within the perimeter and extending outside the core perimeter.

Typically, one or both adhesive layers 440, 442 are laminated or otherwise coupled to the core 410 after apertures 470 are created in the core material. Apertures may be created by any known method for removing material from a structure, such as die cutting, laser cutting, stamping, and the like. In other embodiments, the core 410 may be extruded to include apertures as described in US Publication Nos. 2017/0022339 (Hanschen et al.) and 2016/0002838 (Ausen et al.), all of which are incorporated by reference in its entirety herein.

Figure 8:
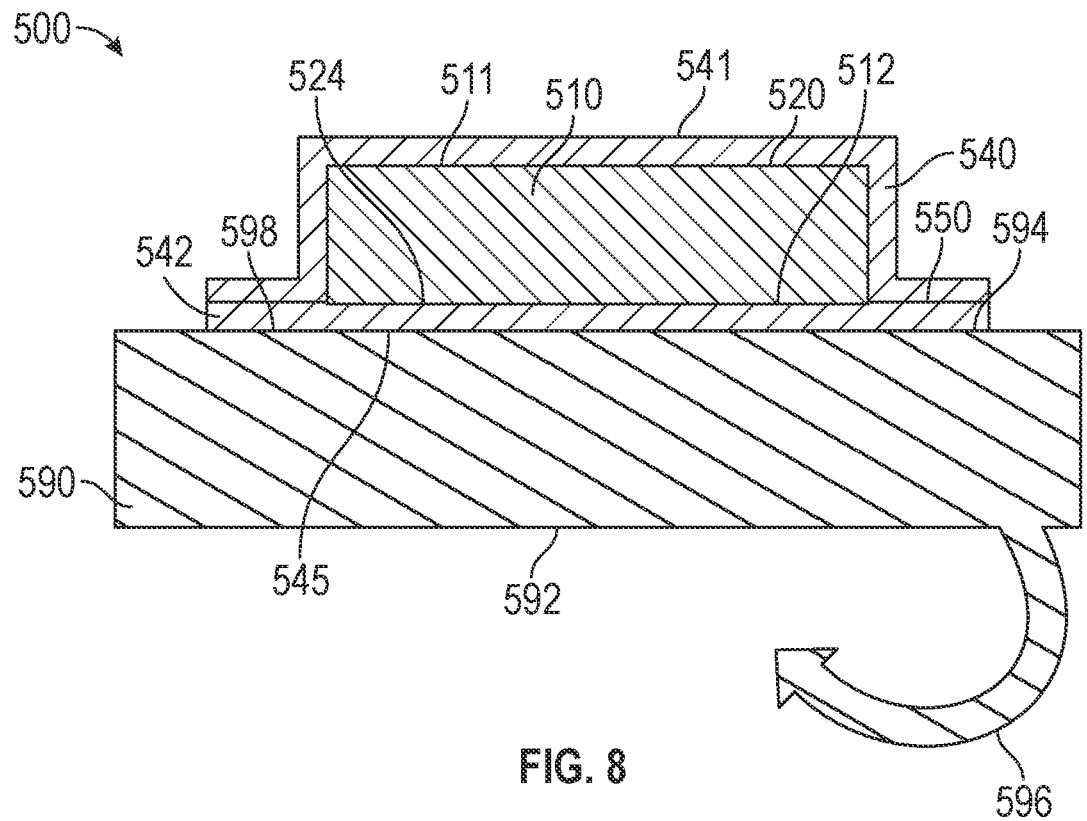
FIG. 8 is a cross-sectional view of another embodiment of an exemplary adhesive article of the type generally described herein.

FIG. 8 shows a cross-sectional representation of an exemplary embodiment of an adhesive article 500 of the type generally described herein that includes a hardgood. Adhesive article 500 includes a hardgood 590, a core 510 and adhesive layers 540, 542. The core 510 can be any of the materials and constructions described herein. The specific hardgood 590 shown in FIG. 8 includes a hook 596 extending from a first major surface 592 both of which are opposite and spaced apart from a second major surface 594. Additional details regarding suitable hardgoods can be found below. Second major surface 594 of hardgood 590 is adjacent to a major surface 545 of the second adhesive layer 542, creating a hardgood interface 598. Contact between the second adhesive layer 542 and second major surface 512 defines a core interface 524 opposing the hardgood interface 598. Likewise, contact between the second adhesive layer 542 and first adhesive layer defines a plurality of adhesive interfaces 550 opposing the hardgood interface 598.

Figure 9:
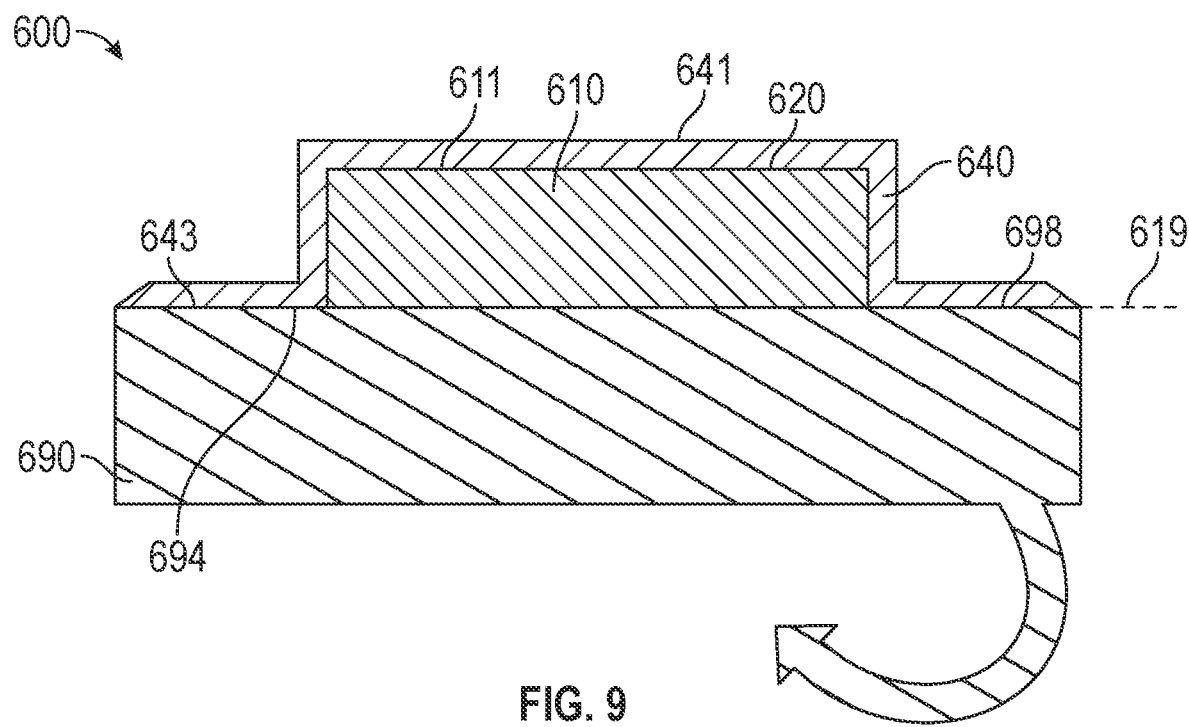
FIG. 9 is a cross-sectional view of one embodiment of an exemplary adhesive article of the type generally described herein.

FIG. 9 depicts another exemplary embodiment of an adhesive article 600 of the type generally described herein including a hardgood 690 and featuring a single peelable adhesive layer 640. The adhesive article includes a core 610 mounted to a hardgood 690 via adhesive layer 640. The core 610 can be any of the materials and constructions described herein. A second major surface 694 of hardgood 690 is adjacent to a second major surface 643 of the first adhesive layer 640, creating a hardgood interface 698 generally coplanar with core plane 619. Contact between the first adhesive layer 640 and first major surface 611 defines a core interface 620 disposed above the hardgood interface 698. The first major surface 641 of the adhesive layer 640 can be coupled to the desired adherend (e.g., wall surface, cabinet surface, etc.). The bond strength at the hardgood interface 698 is preferably stronger than: 1) the cohesive strength of the core; 2) the bond at the core interface 620, or 3) a combination thereof. The lack of adhesive-adhesive interface may result in the near complete degradation and/or disassembly of adhesive article 600 upon removal from the hardgood (or the mounting surface). This may be nevertheless acceptable under circumstances where the user can accept disposing of each constituent element of adhesive article 600 separately.

Figure 10:
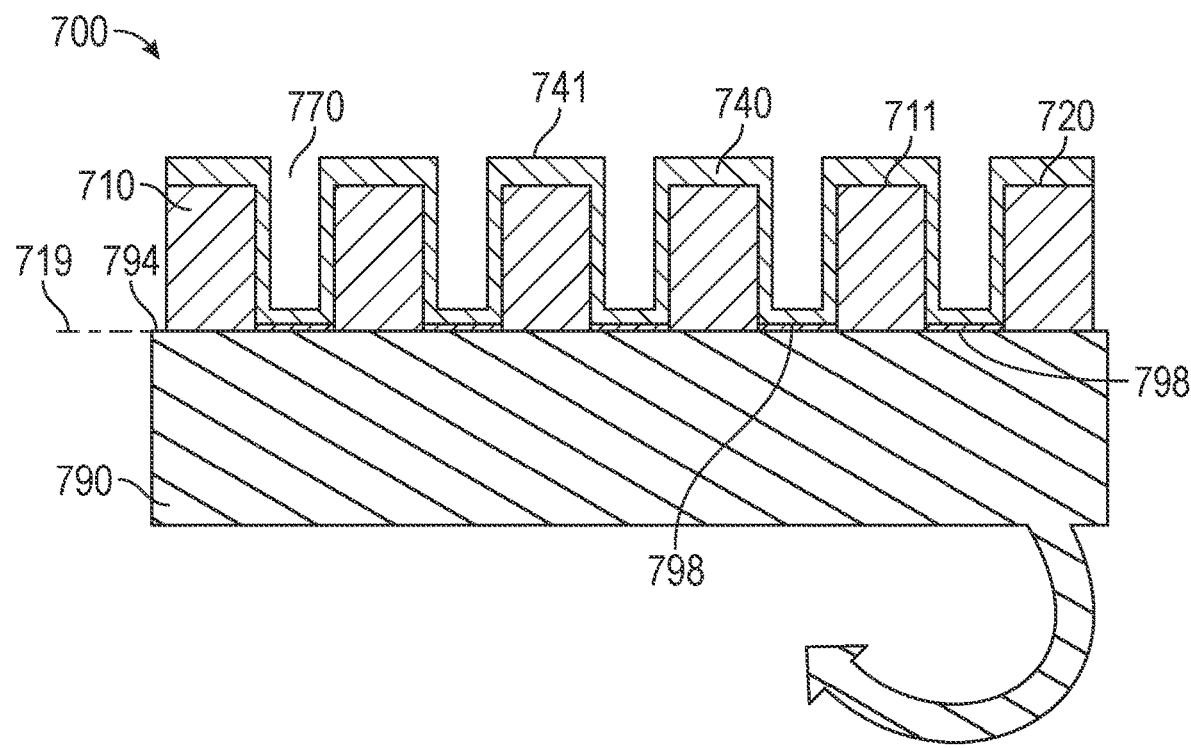
FIG. 10 is a cross-sectional view of another embodiment of an exemplary adhesive article of the type generally described herein.

FIG. 10 depicts another exemplary embodiment of an adhesive article of the type generally described herein including a hardgood 790, an apertured core 710 and a single peelable adhesive layer 740. The core 710 can be any of the materials and constructions described herein and includes an arranged array of apertures 770 extending through the thickness "T" of the core material. A second major surface 794 of hardgood 790 is affixed to the first adhesive layer 740, creating a plurality of hardgood interfaces 798 in a plane generally parallel if not coplanar with core plane 719 within at least some of the apertures 770. Contact between the adhesive layer 740 and first major surface 711 defines a core interface 720 disposed in a plane above the hardgood interfaces 798. The first major surface 741 of the adhesive layer 740 can be used to fix the article 700 to the desired adherend (e.g., wall surface, cabinet surface, etc.). The bond strength at the plurality of hardgood interfaces 798 is preferably stronger than: 1) the cohesive strength of the core 710; 2) the bond at the core interface 720, or 3) a combination thereof. The increase in the number of adhesive-hardgood interfaces within the core perimeter may improve the separation of the core 710 from the adhesive layer 740 during peel removal, ensuring the adhesive can sufficiently stretch to avoid demonstrable damage.

Core Material

The core is part of the adhesive construction and interferes with the interfacial bonding of portions of otherwise adjacent adhesive layers. The core material can be selected provide a low energy surface to allow easy separation between the core and the peelable adhesive. The core can be a single layer or a multilayer construction. More than one core layer can be present in the core. Multiple core layers can be separated by layers of film, which may further contain one or more layers. In some embodiments, the core includes at least one of plastic, metal, paper, nonwoven material, textile, woven material, foam, adhesive, gel, and/or a filament reinforced material. In some embodiments, the core is at least one of a single layer of material or a multilayer film. In other embodiments, the core can be an arrangement of particles disposed between adjacent adhesive layers.

In some embodiments, two or more sub-layers can be co-extruded so as to form the core. In some embodiments, the core is flexible. Some embodiments include dyes or pigments in the core. Some embodiments include at least one tackifier in at least one layer of the core. Some embodiments include a plasticizing oil in one or more layers of the core.

The core can be made of any desired material or materials. Representative examples of materials suitable for the core can include, for example, polyolefins, such as polyethylene, including high density polyethylene, low density polyethylene, linear low density polyethylene, and linear ultralow density polyethylene, polypropylene, and polybutylenes: vinyl copolymers, such as polyvinyl chlorides, both plasticized and unplasticized, and polyvinyl acetates; olefinic copolymers, such as ethylene/methacrylate copolymers, ethylene/vinyl acetate copolymers, acrylonitrile-butadienestyrene copolymers, and ethylene/propylene copolymers; acrylic polymers and copolymers; polyurethanes; and combinations of the foregoing. Mixtures or blends of any plastic or plastic and elastomeric materials such as polypropylene/polyethylene, polyurethane/polyolefin, polyurethane/polycarbonate, polyurethane/polyester, can also be used.

In some embodiments, the core is or includes a composite foam that includes a flexible polymeric foam layer, a first film laminated to a first major surface of the foam layer, and a second film laminated to a second, opposite major surface of the foam layer. Adhesive(s) can be attached to the films to form a structure of adhesive-film-foam-film-adhesive. The flexible polymeric foam layer can be chosen to optimize conformability and resiliency properties which are helpful when an adhesive article is to be adhered to surfaces having surface irregularities. Such is the case with a typical wall surface. An exemplary flexible polymeric foam layer is commercially available under the trade designation "Command" from Minnesota Mining and Manufacturing Company ("3M") of St. Paul, Minn. In some embodiments, the flexible polymeric foam layer of the core can include polyolefin foams which are available under the trade designations "Volextra" and "Volara" from Voltek, Division of Sekisui America Corporation. Lawrence, Mass. In some embodiments, the core is or includes a metal or is metal-like. In some embodiments, the core is or includes wood or is wood-like.

The core can be or include any of the materials or backings described in any of the following patent applications, all of which are incorporated in their entirety herein, PCT Application No. US2018/024347 and WO Publication Nos. 2015/195344, 2017/136432, and 2018/039584.

In various embodiments, the core can be fabricated or produced from microstructured tape materials described in, e.g., U.S. Pat. No. 8,530,021 to Bartusiak et al.

In some embodiments, the core may include the patterned cores described in 3M Attorney Case No. PCT/US18/47864, entitled "Adhesive Articles Permitting Damage Free Removal", filed contemporaneously herewith.

The core can be any desired shape including, for example, square, rectangle, triangular, polygon, circular, quadrilateral trapezoidal cylindrical, half-circular, star-shaped, half-moon shaped, tetrahedral, etc.

The core can be substantially non-stretchable or elastic. In some embodiments, the core material has a storage modulus of between about $15 \times 10^3$ Pa and about $2.5 \times 10^6$ Pa at 25 degrees Celsius. In some embodiments, the core material has a tan δ (where tan δ is the loss modulus divided by the storage modulus) of between about 0.4 and about 1.2 at 25 degrees Celsius. In some embodiments, the core has a glass transition temperature of between about −125 and about 40 degrees Celsius. In other embodiments, the core material has a stress relaxation between 10% and 100% after 10 seconds.

In some embodiments, the core exhibits an elastic recovery of 1-99% at 10% strain. In some embodiments, the core exhibits an elastic recovery of 1-99% at 20% strain. In some embodiment of the disclosure, the core material has an elongation at break of greater than 50% in at least one direction. In some embodiment of the disclosure, the core material has an elongation at break of between about 50% and about 1200% in at least one direction.

In some embodiments, the core has a Young's modulus of between about 100 psi and about 100,000 psi. In some embodiments, the core exhibits an elastic recovery of 1-100% at 10% strain as measured by ASTM D5459-95. In some embodiments, the core exhibits an elastic recovery of 1-100% at 20% strain.

In some embodiments, the core has a modulus of elasticity and/or a modulus of secant of between about 100 psi and about 15,000 psi as determined by at least one of ASTM D638-14 and ASTM D412-06a. In some embodiments, the core has a modulus ranging between 100 psi and 15000 psi. In some embodiments the modulus is greater than 100 psi, greater than 500 psi, greater than 1000 psi. In some embodiments the core modulus is less than 15000 psi, less than 10000 psi, less than 8,000 psi, less than 5,000 psi, less than 3,500 psi, less than 2000 psi, and less than 1500 psi.

In some embodiments, the core has a thickness of between about 0.1 mils and about 100 mils. In some embodiments, the core has a thickness of greater than 1 mil, greater than 5 mils, greater than 8 mils, greater than 10 mils, greater than 12 mils, greater than 15 mils, greater than 20 mils, greater than 22 mils, or greater than 24 mils. In some embodiments, the core has a thickness of less than 100 mils, less than 90 mils, less than 80 mils, less than 75 mils, less than 70 mils, less than 65 mils, less than 60 mils, less than 55 mils, less than 50 mils, less than 45 mils, less than 40 mils, less than 38 mils, less than 35 mils, less than 32 mils, less than 30 mils, less than 28 mils, or less than 25 mils.

Nonwovens

In some presently preferred embodiments, the core includes a nonwoven substrate. The nonwoven substrate can be a nonwoven fabric or web manufactured by any of the commonly known processes for producing nonwoven webs. As used herein, the term "nonwoven" refers to a fabric that has a structure of individual fibers or filaments which are randomly and/or unidirectionally interlaid in a mat-like fashion, but not in an identifiable manner as in a knitted fabric. Nonwoven fabrics or webs can be formed from various processes such as meltblowing processes, spunbonding processes, spunlacing processes, and bonded carded web processes, air laying processes, and wet laying processes. In some embodiments, the core comprises multiple layers of nonwoven materials with, for example, at least one layer of a meltblown nonwoven and at least one layer of a spunbonded nonwoven, or any other suitable combination of nonwoven materials. For example, the core may be a spunbond-meltbond-spunbond, spunbond-spunbond, or spunbond-spunbond-spunbond multilayer material. Or, the core may be a composite web comprising a nonwoven layer and a film layer.

"Meltblowing", as used herein, means a method for forming a nonwoven fibrous web by extruding a molten fiber-forming material through a plurality of orifices in a die to form fibers while contacting the fibers with air or other attenuating fluid to attenuate the fibers into fibers, and thereafter collecting the attenuated fibers. An exemplary meltblowing process is taught in, for example, U.S. Pat. No. 6,607,624 (Berrigan et al.). "Meltblown fibers" means fibers prepared by a meltblowing or meltblown process. "Spunbonding" and "spun bond process" mean a method for forming a nonwoven fibrous web by extruding molten fiber-forming material as continuous or semi-continuous fibers from a plurality of fine capillaries of a spinneret, and thereafter collecting the attenuated fibers. An exemplary spun-bonding process is disclosed in, for example, U.S. Pat. No. 3,802,817 to Matsuki et al. "Spun bond fibers" and "spun-bonded fibers" mean fibers made using spun-bonding or a spun bond process. Such fibers are generally continuous fibers and are entangled or point bonded sufficiently to form a cohesive nonwoven fibrous web such that it is usually not possible to remove one complete spun bond fiber from a mass of such fibers. The fibers may also have shapes such as those described, for example, in U.S. Pat. No. 5,277,976 to Hogle et al, which describes fibers with unconventional shapes. "Carding" and "carding process" mean a method of forming a nonwoven fibrous web webs by processing staple fibers through a combing or carding unit, which separates or breaks apart and aligns the staple fibers in the machine direction to form a generally machine direction oriented fibrous nonwoven web. Exemplary carding processes and carding machines are taught in, for example, U.S. Pat. No. 5,114,787 to Chaplin et al. and U.S. Pat. No. 5,643,397. "Bonded carded web" refers to nonwoven fibrous web formed by a carding process wherein at least a portion of the fibers are bonded together by methods that include for example, thermal point bonding, autogenous bonding, hot air bonding, ultrasonic bonding, needle punching, calendering, application of a spray adhesive, and the like. Further details regarding the production and characteristics of nonwoven webs and laminates including nonwoven webs may be found, for example, in U.S. Pat. No. 9,469,091 (Henke et al.), which is incorporated by reference in its entirety herein. "Air-laying" refers to a process in which bundles of small fibers having typical lengths ranging from about 3 to about 52 millimeters (mm) are separated and entrained in an air supply and then deposited onto a forming screen, usually with the assistance of a vacuum supply. The randomly oriented fibers may then be bonded to one another using, for example, thermal point bonding, autogenous bonding, hot air bonding, needle punching, calendering, a spray adhesive, and the like. An exemplary air-laying process is taught in, for example, U.S. Pat. No. 4,640,810 to Laursen et al. "Wet-laying" refers to a is a process in which bundles of small fibers having typical lengths ranging from about 3 to about 52 millimeters (mm) are separated and entrained in a liquid supply and then deposited onto a forming screen, usually with the assistance of a vacuum supply. Water is typically the preferred liquid. The randomly deposited fibers may by further entangled (e.g., hydro-entangled), or may be bonded to one another using, for example, thermal point bonding, autogeneous bonding, hot air bonding, ultrasonic bonding, needle punching, calendering, application of a spray adhesive, and the like. An exemplary wet-laying and bonding process is taught in, for example, U.S. Pat. No. 5,167,765 to Nielsen et al. Exemplary bonding processes are also disclosed in, for example, U.S. Pat. No. 9,139,940 to Berrigan et al.

Fibrous materials that provide useful nonwoven cores may be made of natural fibers (e.g., wood or cotton fibers), synthetic fibers (e.g., thermoplastic fibers), or a combination of natural and synthetic fibers. Exemplary materials for forming thermoplastic fibers include polyolefins (e.g., polyethylene, polypropylene, polybutylene, ethylene copolymers, propylene copolymers, butylene copolymers, and copolymers and blends of these polymers), polyesters, and polyamides. The nonwoven substrate may be formed from fibers or filaments made of any suitable thermoplastic polymeric material. Suitable polymeric materials include, but are not limited to, polyolefins, poly(isoprenes), poly(butadienes), fluorinated polymers, chlorinated polymers, polyamides, polyimides, polyethers, poly(ether sulfones), poly(sulfones), poly(vinyl acetates), copolymers of vinyl acetate, such as poly(ethylene)-co-poly(vinyl alcohol), poly(phosphazenes), poly(vinyl esters), poly(vinyl ethers), poly(vinyl alcohols), and poly(carbonates). Suitable polyolefins include, but are not limited to, poly(ethylene), poly(propylene), poly(l-butene), copolymers of ethylene and propylene, alpha olefin copolymers (such as copolymers of ethylene or propylene with 1-butene, 1-hexene, 1-octene, and 1-decene), poly(ethylene-co-1-butene) and poly(ethylene-co-1-butene-co-1-hexene). Suitable fluorinated polymers include, but are not limited to, poly(vinyl fluoride), poly(vinylidene fluoride), copolymers of vinylidene fluoride (such as poly(vinylidene fluoride-co-hexafluoropropylene), and copolymers of chlorotrifluomethylene (such as poly(ethylene-co-chlorotrifluoroethylene). Suitable polyamides include, but are not limited to: poly(iminoadipoyliminohexamethylene), poly(iminoadipoyliminodecamethylene), and polycaprolactam. Suitable polyimides include poly(pyromellitimide). Suitable poly(ether sulfones) include, but are not limited to, poly(diphenylether sulfone) and poly(diphenylsulfone-co-diphenylene oxide sulfone). Suitable copolymers of vinyl acetate include, but are not limited to, poly(ethylene-co-vinyl acetate) and such copolymers in which at least some of the acetate groups have been hydrolyzed to afford various poly(vinyl alcohols) including, poly(ethylene-co-vinyl alcohol).

The fibers may also be multi-component fibers, for example, having a core of one thermoplastic material and a sheath of another thermoplastic material. The sheath may melt at a lower temperature than the core, providing partial, random bonding between the fibers when the mat of fibers is exposed to a sheath melts. A combination of mono-component fibers having different melting points may also be useful for this purpose. In some embodiments, the nonwoven fabric or web useful in the core according to the present disclosure is at least partially elastic. Examples of polymers for making elastic fibers include thermoplastic elastomers such as ABA block copolymers, polyurethane elastomers, polyolefin elastomers (e.g., metallocene poly olefin elastomers), olefin block copolymers, polyamide elastomers, ethylene vinyl acetate elastomers, and polyester elastomers. An ABA block copolymer elastomer generally is one where the A blocks are polystyrenic, and the B blocks are prepared from conjugated dienes (e.g., lower alkylene dienes). The A block is generally formed predominantly of substituted (e.g., alkylated) or unsubstituted styrenic moieties (e.g., polystyrene, poly(alphamethylstyrene), or poly(t-butylstyrene)), having an average molecular weight from about 4,000 to 50,000 grams per mole. The B block(s) is generally formed predominantly of conjugated dienes (e.g., isoprene, 1,3-butadiene, or ethylene-butylene monomers), which may be substituted or unsubstituted, and has an average molecular weight from about 5,000 to 500,000 grams per mole. The A and B blocks may be configured, for example, in linear, radial, or star configurations. An ABA block copolymer may contain multiple A and/or B blocks, which blocks may be made from the same or different monomers. A typical block copolymer is a linear ABA block copolymer, where the A blocks may be the same or different, or a block copolymer having more than three blocks, predominantly terminating with A blocks. Multi-block copolymers may contain, for example, a certain proportion of AB diblock copolymer, which tends to form a more tacky elastomeric film segment. Other elastic polymers can be blended with block copolymer elastomers, and various elastic polymers may be blended to have varying degrees of elastic properties. Many types of thermoplastic elastomers are commercially available, including those from BASF, Florham Park. N.J., under the trade designation "STYROFLEX", from Kraton Polymers. Houston, Tex., under the trade designation "KRATON", from Dow Chemical, Midland, Mich., under the trade designation "PELLETHANE", "INFUSE", VERSIFY", or "NORDEL", from DSM, Heerlen, Netherlands, under the trade designation "ARNITEL", from E. I, duPont de Nemours and Company, Wilmington, Del., under the trade designation "HYTREL", from ExxonMobil, Irving, Tex. under the trade designation "VISTAMAXX", and more.

For example, the fibrous nonwoven web can be made by carded, air laid, wet laid, spunlaced, spunbonding, electrospinning or melt-blowing techniques, such as melt-spun or melt-blown, or combinations thereof. Any of the non-woven webs may be made from a single type of fiber or two or more fibers that differ in the type of thermoplastic polymer, shape, and/or thickness; the single fiber type or at least one of the multiple fiber types may each be a multicomponent fiber as described above.

Staple fibers may also be present in the web. The presence of staple fibers generally provides a loftier, less dense web than a web of only melt blown microfibers. A loftier web may have reduced cohesive strength at the core interface or the in bulk of the core itself, leading to easier separation from one or more adhesive layers.

A nonwoven core may optionally further comprise one or more layers of scrim. For example, either or both major surfaces may each optionally further comprise a scrim layer. The scrim, which is typically a woven or nonwoven reinforcement made from fibers, is included to provide strength to the nonwoven article. Suitable scrim materials include, but are not limited to, nylon, polyester, fiberglass, polyethylene, polypropylene, and the like. The average thickness of the scrim can vary. The layer of the scrim may optionally be bonded to the nonwoven substrate. A variety of adhesive materials can be used to bond the scrim to the substrate. Alternatively, the scrim may be heat-bonded to the nonwoven.

Useful nonwoven cores may have any suitable EFD, basis weight or thickness that is desired for a particular application. "Effective Fiber Diameter" or "EFD" is the apparent diameter of the fibers in a fiber web based on an air permeation test in which air at 1 atmosphere and room temperature is passed through a web sample at a specified thickness and face velocity (typically 5.3 cm/sec), and the corresponding pressure drop is measured. Based on the measured pressure drop, the Effective Fiber Diameter is calculated as set forth in Davies, C. N., The Separation of Airborne Dust and Particulates. Institution of Mechanical Engineers, London Proceedings, IB (1952). The fibers of the nonwoven substrate typically have an effective fiber diameter of from at least 0.1, 1, 2, or even 4 micrometers and at most 125, 75, 50, 35, 25, 20, 15, 10, 8, or even 6 micrometers. Spunbond cores typically have an EFD of no greater than 35, while air-laid cores may have a larger EFD on the order of 100 microns. The nonwoven core preferably has a basis weight in the range of at least 5, 10, 20, or even 50 g/m$^2$; and at most 800, 600, 400, 200, or even 100 g/m$^2$. Basis weight is calculated from the weight of a 10 cm×10 cm sample. The minimum tensile strength of the nonwoven web is about 4.0 Newtons in the machine direction.

The loft of core nonwovens can also be characterized in terms of Solidity (as defined herein and as measured by methods reported herein).

Solidity is determined by dividing the measured bulk density of a nonwoven fibrous web by the density of the materials making up the solid portion of the web. Bulk density of a web can be determined by first measuring the weight (e.g., of a 10-cm-by-10-cm section) of a web. Dividing the measured weight of the web by the web area provides the basis weight of the web, which is reported in g/m2. The thickness of the web can be measured by obtaining (e.g., by die cutting) a 135 mm diameter disk of the web and measuring the web thickness with a 230 g weight of 100 mm diameter centered atop the web. The bulk density of the web is determined by dividing the basis weight of the web by the thickness of the web and is reported as g/m3. The Solidity is then determined by dividing the bulk density of the nonwoven fibrous web by the density of the material (e.g., polymer) comprising the solid filaments of the web. The density of a bulk polymer can be measured by standard means if the supplier does not specify the material density. Loft is usually reported as 100% minus the Solidity (e.g., a Solidity of 7% equates to a loft of 93%).

As disclosed herein, webs of Solidity from about 2.0% to less than 12.0% (i.e., of loft of from about 98.0% to greater than 88.0%) can be produced. In various embodiments, webs as disclosed herein comprise a Solidity of at most about 7.5%, at most about 7.0%, or at most about 6.5%. In further embodiments, webs as disclosed herein comprise a Solidity of at least about 5.0%, at least about 5.5%, or at least about 6.0%.

Polymeric Films

In many embodiments of the present disclosure, the core may include or consist of a polymeric film. Polymeric film core layers can be in a variety of forms including, for example, a single-layer or multi-layer film, a porous film, and combinations thereof. The polymeric film may contain one or more fillers (e.g., calcium carbonate). The polymer film can be a continuous layer or a discontinuous layer. Multi-layer polymer films are preferably integrally bonded to one another in the form of a composite film, a laminate film, and combinations thereof. Multilayer polymeric films can be prepared using any suitable method including, for example, co-molding, coextruding, extrusion coating, joining through an adhesive, joining under pressure, joining under heat, and combinations thereof.

The film may comprise a single polymeric material or may be prepared from a mixture of polymeric materials. Examples of suitable materials include polyesters such as polyethylene terephthalate, polyethylene naphthalate, copolyesters or polyester blends based on naphthalene dicarboxylic acids; polycarbonates; polystyrenes; styrene-acrylonitriles; cellulose acetates; polyether sulfones; poly(meth)acrylates such as polymethylmethacry-late; polyurethanes: polyvinyl chloride; polycyclo-olefins; polyimides; or combinations or blends thereof.

Examples of materials that can be included in the core include polyolefins such as polyethylene, polypropylene (including isotactic polypropylene), polystyrene, polyester, polyvinyl alcohol, poly(ethylene terephthalate), poly(butylene terephthalate), polyimide, poly(caprolactam), poly(vinylidene fluoride), polylactides, cellulose acetate, and ethyl cellulose and the like.

The polymeric film layer can be a single layer or a multilayer construction. More than one polymeric film layer can be present. The polymeric film layers can be comprised of any film-forming polymers.

In some embodiments, the polymeric film layer(s) includes at least one of a vinylaromatic copolymer, a linear low density polyethylene, a low density polyethylene, a high density polyethylene, a copolymer of ethylene and (meth)acrylate monomers, a copolymer of ethylene and (meth)acrylate monomers containing acid modifications, a copolymer of ethylene and vinyl acetate, a copolymer of ethylene and vinyl acetate containing acrylate, and/or acid modifications. In some embodiments, the film contains polymers from olefin monomers with between 2 and 16 carbons. In some embodiments, the film is a copolymer of two or more olefin monomers. In some embodiments, the film contains polymers from olefin monomers with atactic, syndiotactic, or isotactic stereochemistry. In some embodiments, the film is a copolymer of one or more olefin monomers polymerized using a metallocene catalyst. In some embodiments, the film is comprised of vinyl copolymers such as poly(vinyl chloride), poly(vinyl acetate), and the like. In some embodiments, the film is a blend comprised of any of the polymers listed above.

Exemplary suitable film materials can include SEBS, SEPS, SIS, SBS, polyurethane, ethyl vinylacetate (EVA), ultra low linear density polyethylene (ULLDPE), hydrogenated polypropylene, ethyl methyl acrylate (EMA), ultra low linear density polyethylene (ULLDPE), hydrogenated polypropylene, high density polyethylene (HDPE), low density polyethylene (LDPE), linear low density polyethylene (LLDPE, polyesters including polyethylene terephthalate (PET), and combinations or blends thereof. In some embodiments, the polymeric film consists of multiple layers of any of the polymers listed above. In particular embodiments, the multiple layers include a core layer and one or more skin layers, as described in PCT Application No. US2017/016039 (Runge et al.), incorporated herein by reference in its entirety.

The polymer films described herein can be produced using any method known in the art.

Particles

In some embodiments, the core layer consists of an assortment of particles. The particles can be distributed in one or more core layers. In general, the particles may be solid, hollow or porous and rigid or non-rigid. The particles may be made of any suitable material including wood, glass, ceramics, polymers, metals, metal oxides, and carbon materials. The particles of the core layer are generally in the size range of from about 1 micron to about 100 mils. Different particles can be distributed in different core layers. One core layer can also contain multiple compositions, types, or sizes of particles. The particles in one core layer may be of the same or different composition and surface treatment. The particles can be arranged in a particular shape or can be distributed unevenly. The surface of the particles may be treated or functionalized to be hydrophobic or to be hydrophilic. The particles can be agglomerated or non-agglomerated and aggregated or non-aggregated. "Agglomerate" refers to a weak association between primary particles which may be held together by charge or polarity and can be broken down into smaller entities. "Aggregate" refers to strongly bonded or fused particles where the resulting external surface area may be significantly smaller than the sum of calculated surface areas of the individual components. The forces holding an aggregate together can include strong forces, for example, covalent bonds, or those resulting from sintering or complex physical entanglement. An aggregate may also be held together by reversible or temperature dependent bonds (e.g., ionic bonds).

In some embodiments, the core includes inorganic particles. The inorganic particles can be natural or synthetic. The term "synthetic inorganic particles" as used herein includes any particles that has been transformed, regenerated, recrystallized, reconstituted, etc., from an original state which may be its naturally occurring, mined state into its current state by a chemical synthesis process (e.g., precipitated from solution, generated by flame hydrolysis, etc.) or by a physical synthesis process (e.g., precipitated from a gaseous phase, solidified by way of a sol-gel process, etc.). The term "synthetic inorganic filler" as used herein also includes any filler that has been substantially transformed from an original state (which may be its naturally occurring, mined state) into its current state by a physical synthesis process of being brought into an at least partially softened or molten state and then solidified by cooling, such that any substantially crystalline structure that may have existed in the natural state is substantially erased such that the material is now in a substantially amorphous form (e.g., comprising less than about 0.5 percent crystallinity by weight). Such processes may include, for example, melt processing, flame-fusion and the like. Conversely, "natural inorganic particles" is defined as a mineral that has been extracted from the earth in its naturally occurring form, and, while possibly being subjected to purification and/or modification processes is used while still substantially in its naturally occurring form.

Using the definitions provided above, synthetic inorganic particles include, for example, so-called glass bubbles or microspheres (such as those available from 3M Company of St Paul, Minn. under the trade designation 3M Glass Bubbles), ceramic microspheres (such as those available from 3M Company under the trade designation 3M Ceramic Microspheres), synthetic clays (e.g., synthetic silicate clays such as those available under the trade designation Laponite from Southern Clay Products of Gonzales, Tex.), precipitated silica, fumed silica, vitreous silica, synthetic titanium dioxide (as made, for example, by the sulfate process or the chloride process), synthetic (precipitated) calcium carbonate (as made, for example, by passing carbon dioxide through a solution of calcium hydroxide), and the like.

Suitable natural inorganic particles include calcite, witherite, rutile, anatase, ilmenite, mica, sericite, perlite, talc, limestone, silica, barite, gypsum, calcined gypsum, kaolinite, montmorillonite, attapulgite, illite, saponite, hectorite, beidellite, stevensite, sepiolite, bentonite, pyrophyllite, diatomaceous earth, and the like, as well as mixtures thereof.

If used in the core, polymeric particles may be made of any suitable polymeric material. Polymeric particles may be made of rigid materials or elastomeric materials. Suitable rigid polymeric materials include thermosetting polymers, e.g., phenolic polymers, or thermoplastic polymers, e. g., polyvinylidene chloride acrylonitrile copolymers (PVDC copolymers). Exemplary elastomeric microspheres are described in U.S. Pat. No. 3,691,140 to Silver, U.S. Pat. Nos. 3,857,731 and 4,166,152 to Baker et al. In another aspect, the fluid-filled microsphere comprises a polymer shell consisting of either acrylonitrile copolymer or polyvinylidene chloride copolymer with a calcium carbonate coating, such as that sold under the tradename DUALITE polymeric microspheres by Henkel.

Other exemplary particles include fused aluminum oxide, heat treated aluminum oxide, white fused aluminum oxide, black silicon carbide, green silicon carbide, titanium diboride, boron carbide, tungsten carbide, titanium carbide, diamond (both natural and synthetic), silica, iron oxide, chromia, ceria, zirconia, titania, silicates, tin oxide, cubic boron nitride, garnet, fused alumina zirconia, sol gel particles, and the like, as well as mixtures thereof.

Typically, the particles used in the core have an average primary (in some embodiments, average primary and agglomerate) particle size (e.g., diameter) of no greater than 1 micron. "Primary particle size" refers to the largest dimension (e.g., the diameter of a spherical particle) of a single (non-aggregated, non-agglomerated) particle. In some embodiments, the particles have an average primary (in some embodiments, average primary and agglomerate) particle size of no greater than 0.1 micron.

The particles can be substantially spherical in shape. However, other shapes such as elongated shapes may alternatively be employed. Examples of such shapes include rods, triangles, platelets, pyramids, cones, solid spheres, hollow spheres and the like. Also, the particles may be randomly shaped.

Gels

If used in the core, a gel typically has a viscosity (to the extent one is measurable) of at least 100,000 Centipoise (cps), at least 500,000 cps, at least 600,000 cps and in yet other embodiments at least 700,000 cps when measured at 23° C. using a Brookfield LVT viscometer. In some embodiments, the core can have a gel content (i.e., gel fraction) of greater than 25%, or greater than 50%, or greater than 80%, when measured by extraction of soluble polymer in a suitable solvent (e.g., heated tetrahydrofuran or toluene). In some embodiments, the gel is an adhesive as described below. The bonds or other attractive forces in certain gels may be reconstitutable after separation, allowing a gel core to be reused even after an adhesive article has been removed from an adherend.

Thixotropic gels are particularly useful for inclusion in the core because they are less likely to flow under forces typically experienced during use of the adhesive articles of the present disclosure. Suitable gels include gels containing glycerine (see, for example, U.S. Pat. No. 3,780,537 (Spencer) and U. S. Patent Application Pub. No. US 2010/0274333 (Dunshee et al.)); gels containing silicone and siloxy-containing compounds (see, for example, U.S. Pat. No. 7,795,326 (Salamone et al.)); gels containing propylene glycol (see, for example, U.S. Pat. No. 5,843,145 (Brink)); gels containing a crosslinked, water-absorbing polymer such as crosslinked polyacrylamide and sodium polyacrylate (see, for example, U.S. Pat. No. 5,697,961 (Kiamil); and hydrophilic gels prepared from starting materials such as poly (ethylene oxide), polyvinyl pyrrolidone, polyacrylamide, anionic polyacrylamide, polyvinyl alcohol, maleic anhydride-vinylether copolymers, polyacrylic acid, ethylene-malcic anhydride copolymers, polyvinylether, dextran, gelatin, hydroxyl propyl cellulose, methyl cellulose, carboxymethyl cellulose, hydroxyethyl-carboxymethyl cellulose, hydroxyethyl cellulose, propylene glycol alginate, sodium alginate, polyethyleneimine, polyvinyl alkylpyridinium halides, polyproline, natural starches, casein, proteins, polymethacrylic acid, polyvinylsulfonic acid, polystyrene sulfonic acid, polyvinylamine, poly-4-vinylpyridine, polymerized monoesters of olefinic acids, polymerized diesters of olefinic acids, acrylamide and difunctional polymerizable materials (e.g., diacids, diesters or dianides), and the like.

Exemplary suitable gels are commercially available as NICKOLODEON GAK (from NSI International).

Adhesive

In some embodiments, the core includes an adhesive. In some embodiments, the core is a pressure-sensitive adhesive. A general description of useful pressure sensitive adhesives may be found in the Encyclopedia of Polymer Science and Engineering. Vol. 13, Wiley-Interscience Publishers (New York. 1988). Additional description of useful pressure-sensitive adhesives may be found in the Encyclopedia of Polymer Science and Technology. Vol. 1, Interscience Publishers (New York, 1964). Pressure sensitive adhesive compositions are well known to those of ordinary skill in the art to possess properties including the following: (1) tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Suitable PSAs may be based on crosslinked or non-crosslinked (meth)acrylics, rubbers, thermoplastic elastomers, silicones, polyurethanes, and the like, and may include tackifiers in order to provide the desired tac, as well as other additives. In some embodiments, the PSA is based on a (meth)acrylic PSA or at least one poly(meth)acrylate, where (meth)acrylate refers to both acrylate and methacrylate groups. In some embodiments, the PSA is an olefin block copolymer based adhesive. Acrylic based pressure sensitive adhesives are described in U.S. Pat. No. 4,726,982 (Traynor et al.) and in U.S. Pat. No. 5,965,256 (Barrera), for example. Silicone based pressure sensitive adhesives are described in U.S. Pat. No. 6,730,397 (Melancon et al.) and U.S. Pat. No. 5,082,706 (Tangney), for example. Polyurethane based pressure sensitive adhesives are described in U.S. Pat. Appl. Pub. No. 2005/0137375 (Hansen et al.), for example. Olefin block copolymer based pressure sensitive adhesives are described in U.S. Pat. Appl. Pub. No. 2014/0335299 (Wang et al.), for example.

The core may include a plurality of adhesive layers. For example, the core may include a relatively stiff rubber based adhesive as an inner layer, with a softer acrylic based PSA disposed between the inner core layer and the peelable adhesive layer(s). As another example, the core may include a relatively soft acrylic based adhesive as an inner layer, with a relatively stiffer rubber based adhesive disposed between the inner core layer and the peelable adhesive layer(s). The characteristics of the adhesive in the core may be selected or modified to achieve the desired properties.

If used in the core, an adhesive can be of a different composition from the peelable adhesive layer(s) to avoid an increase in cohesive strength at any core-adhesive interface. Alternatively, the surface of the adhesive can be modified by release materials or deadening layer(s), as described above.

Peelable Adhesive Layer(s)

The adhesives used in the adhesive articles described herein can include any adhesive having the desired properties. In some embodiments, the adhesive is peelable. In some embodiments, the adhesive releases cleanly from the surface of an adherend when the adhesive article is peeled at an angle of about 35° or less from a surface of the adherend. In some embodiments, the peelable adhesive releases from a surface of an adherend when the multilayer carrier is peeled at an angle of about 35° or greater from the adherend surface such that there are substantially no traces of the adhesive left behind on the surface of the adherend.

The adhesive can be, for example, any of the adhesives described in any of the following patent applications, all of which are incorporated by reference herein: International Publication Nos. WO/2015/035556, WO/2015/035960, WO/2017/136219, WO/2017/136188 and U.S. Patent Application No. 2015/034104, all of which are incorporated herein in their entirety.

In some embodiments, the peelable adhesive is a pressure sensitive adhesive. Any suitable composition, material or ingredient can be used in the pressure sensitive adhesive. Exemplary pressure sensitive adhesives utilize one or more thermoplastic elastomers, e.g., in combination with one or more tackifying resins. In some embodiments, the adhesive is not a pressure sensitive adhesive.

In some embodiments, the peelable adhesive layer can include at least one of rubber, silicone, or acrylic based adhesives. In some embodiments, the peelable adhesive layer can include a pressure-sensitive adhesive (PSA). In some embodiments, the peelable adhesive can include tackified rubber adhesives, such as natural rubber; olefins; silicones, such as silicone polyureas or silicone block copolymers: synthetic rubber adhesives such as polyisoprene, polybutadiene, and styrene-isoprene-styrene, styrene-ethylene-butylene-styrene and styrene-butadiene-styrene block copolymers, and other synthetic elastomers; and tackified or unlackified acrylic adhesives such as copolymers of isooctylacrylate and acrylic acid, which can be polymerized by radiation, solution, suspension, or emulsion techniques; polyurethanes; silicone block copolymers; and combinations of the above.

Generally, any known additives useful in the formulation of adhesives may also be included. Additives include plasticizers, anti-aging agents, ultraviolet stabilizers, colorants, thermal stabilizers, anti-infective agents, fillers, crosslinkers, as well as mixtures and combinations thereof. In certain embodiments, the adhesive can be reinforced with fibers or a fiber scrim which may include inorganic and/or organic fibers. Suitable fiber scrims may include woven-, non-woven or knit webs or scrims. For example, the fibers in the scrim may include wire, ceramic fiber, glass fiber (for example, fiberglass), and organic fibers (for example, natural and/or synthetic organic fibers).

In some embodiments, the adhesive includes a tackifier. Some exemplary tackifiers include at least one of polyterpene, terpene phenol, rosin esters, and/or rosin acids.

In some embodiments, the peelable adhesive is a flowable adhesive that can be coated onto the backing. In some embodiments, the peelable adhesive is a more solid adhesive as is generally described in, for example, German Patent No. 33 31 016.

In some embodiments, the peelable adhesive has a Tg of between about −125 degrees Celsius and about 20 degrees Celsius, as determined by dynamic mechanical analysis of the tan δ peak value. In some embodiments, the peelable adhesive has a Tg of between about −70 degrees Celsius and about 0 degrees Celsius. In some embodiments, the peelable adhesive has a Tg of between about −60 degrees Celsius and about −20 degrees Celsius. In some embodiments, the peelable adhesive has a Tg of greater than −80 degrees Celsius, greater than −70 degrees Celsius, greater than −60 degrees Celsius, greater than −50 degrees Celsius, greater than −40 degrees Celsius, or great than −30 degrees Celsius. In some embodiments, the peelable adhesive has a Tg of less than 20 degrees Celsius, 10 degrees Celsius, 0 degrees Celsius, −10 degrees Celsius, −20 degrees Celsius, or −30 degrees Celsius.

Some peelable adhesives that can be used in the adhesive articles of the present disclosure have a storage modulus of about 300,000 Pa or greater, about 400,000 Pa or greater, about 500,000 Pa or greater, about 1,000,000 Pa or greater at 25° C. as determined by dynamic mechanical analysis. In other embodiments, the adhesive has a storage modulus of 1,50,000 Pa or less, 7550,000 Pa or less, 500.00 Pa or less, 400,000 Pa or less, 300,000 Pa or less, or 250,000 Pa or less at 25° C. as determined by dynamic mechanical analysis.

In some embodiments, the thickness of the peelable adhesive on at least one of the first or second major surfaces of the core is about 1 μm to about 1 mm.

In some embodiments, adhesion properties of the adhesive can range from 0.1 N/dm to 25 N/dm. In some embodiments, adhesion properties of the adhesive can range from 0.5 N/dm to 10 N/dm. In some embodiments, adhesion properties of the adhesive can range from 1 N/dm to 5 N/dm.

In some embodiments, the peelable adhesive can provide a sheer strength of, for example, 1-20 pounds per square inch as measured by ASTM Test Method D3654M-06.

In some embodiments, the peelable adhesives are tailored to achieve peel with no or minimal damage.

Exemplary methods and articles for doing so are described in, for example, U.S. Pat. No. 6,835,452.

International Publication Nos. WO/2018/039584 and WO/2017/136188, each incorporated herein in their entirety.

Adhesive Article(s)

In some embodiments, the adhesive article further includes a tab. The tab is an area that can be easily accessed by the user to assist in or begin to release the adhesive article from the adherend. The removal tab can be tacky from the outermost adhesive layer or non-tacky by being covered by layers of stretch film, non-stretch film, release liner, or from detackified adhesive.

In some embodiments, the adhesive article further includes one or more release liners. The release liner can be, for example, on either or both of the major surfaces of the adhesive layers. The release liner protects the adhesive during manufacturing, transit, and before use. When the user desires to use the adhesive article, the user can peel or remove the release liner to expose the adhesive. Examples of suitable liners include paper, e.g., kraft paper, or polymeric films, e.g., polyethylene, polypropylene or polyester. At least one surface of the liner can be treated with a release agent such as silicone, a fluorochemical, or other low surface energy based release material to provide a release liner. Suitable release liners and methods for treating liners are described in, e.g., U.S. Pat. Nos. 4,472,480, 4,980,443 and 4,736,048, and incorporated herein. Preferred release liners are fluoroalkyl silicone polycoated paper. The release liners can be printed with lines, brand indicia, or other information.

In some embodiments, the adhesive articles of the present disclosure can be removed from a substrate or surface without damage. In particularly advantageous embodiments, the adhesive articles can be removed from at least one of painted drywall and wallpaper without damage.

Some adhesive articles of the present disclosure have excellent shear strength. Some embodiments of the present disclosure have a shear strength of greater than 1600 minutes as measured according to ASTM D3654-82. Some embodiments of the present disclosure have shear strength of greater than 10,000 minutes as measured according to ASTM D3654-82. Some other embodiments of the present disclosure have shear strength of greater than 100,000 minutes as measured according to ASTM D3654-82.

Some adhesive articles of the present disclosure demonstrate a lower 90° Peel Adhesion Strength to make the adhesive article easier to remove. Others demonstrate a higher 90° Peel Adhesion Strength, yet still provide for damage free removal. Some adhesive articles of the present disclosure can have a higher 90° Peel Adhesion Strength as to permit handling of the adhesive article by the user without accidental separation. Some embodiments of the present disclosure have a 90° Peel Adhesion Strength between about 10 oz/in$^2$ to 300 oz/in$^2$. Some embodiments of the present disclosure have a 900 Peel Adhesion Strength between about 50 oz/in$^2$ to 200 oz/in$^2$.

Some adhesive articles of the present disclosure demonstrate improved weight bearing capacity, holding a 0.5 lbs weight for at least 24 hours according to the Weight Hanging test. In other implementations, the adhesive articles of the present disclosure demonstrate hold a 0.5 lbs weight for at least 24 hours according to the Weight Hanging test. In presently preferred embodiments, the adhesive articles of the present disclosure demonstrate enhanced weight bearing capacity, holding a 0.5 lbs weight for at least 72 hours according to the Weight Hanging test.

Some adhesive articles of the present disclosure have an elongation at break of greater than 50% in at least one direction. Some adhesive articles of the present disclosure have an elongation at break of between about 50% and about 1200% in at least one direction.

Some adhesive articles of the present disclosure have a tensile strength at break sufficiently high so that the adhesive article will not rupture prior to being removed from an adherend at an angle of 350 or greater. In some embodiments, the adhesive articles of the present disclosure exhibit enhanced conformability to a substrate or surface than prior art adhesive mounting articles. In some embodiments, the adhesive articles of the present disclosure hold more weight when adhered or attached to a substrate or surface than prior art adhesive mounting articles. In some embodiments, the adhesive articles of the present disclosure hold more weight for a longer period of time when adhered or attached to a substrate or surface than prior art adhesive mounting articles. In some embodiments, the adhesive articles of the present disclosure remain adhered to a textured, rough, or irregular surface for a longer period of time than prior art adhesive mounting articles. In some embodiments, the adhesive articles of the present disclosure hold a higher amount of weight when adhered to a textured, rough, or irregular surface than prior art adhesive mounting articles.

In some embodiments, the adhesive article is substantially optically clear. Some embodiments have a light transmission of at least about 50%. Some embodiments have a light transmission of at least about 75%. Some embodiments have a haze of no greater than 40%. Some embodiments, have a haze of no greater than 20%. Both the light transmission and the haze of the adhesive article can be determined using, for example, ASTM D1003-95.

In some embodiments, the adhesive article exhibits an elastic recovery of greater than 70% or greater than 800% or greater than 95% at 10% strain. In some embodiments, the adhesive article exhibits an elastic recovery of greater than 70% or greater than 80% or greater than 90% at 25% strain. In some embodiments, the adhesive article exhibits an elastic recovery of greater than 70% or greater than 80% or greater than 90% or greater than 95% at 50% strain. In some embodiments, the adhesive article exhibits an elastic recovery of greater than 50% or greater than 70% or greater than 95% at 100% strain.

In some embodiments, the core can prevent or minimize substrate damage by reducing, minimizing, or eliminating the core material's contribution to the peel force, which aids in damage-free adhesive removal. In some embodiments, this can occur at peel angles ranging from 0-180 degrees. In some embodiments, when the final adhesive article construction is peeled from the adherend at 90-180 degrees the core elongates less than 1% during peeling. In some embodiments, when the adhesive article construction is peeled from the adherend at 90-180 degrees the core elongates less than 5% during peeling. In some embodiments, when the construction is peeled from the adherend at 90-180 degrees the core elongates less than 10% during peeling. In some embodiments, when the article is peeled from an adherend at 90-180 degrees the core elongates more than 10% strain, and elastically recovers more 80% of that deformation. In some embodiments, when the adhesive is peeled from an adherend at 90-180 degrees the core elongates more than 10% strain, and elastically recovers more 90% of that deformation. In some embodiments, when the adhesive article is peeled from an adherend at 90-180 degrees the core elongates more than 10% strain, and elastically recovers more 95% of that deformation. In some embodiments, when the adhesive article is peeled from an adherend at 90-180 degrees the core elongates more than 10% strain, and elastically recovers more 99% of that deformation.

Adhesive articles of the present disclosure can advantageously provide enhanced weight bearing capability with a reduction or elimination of substrate damage on removal. Accordingly, presently preferred embodiments of the present disclosure demonstrate effective weight bearing capacity, a stronger adhesion per square inch of available adhesive area, and peel-removability from a painted drywall substrate without damage.

Hardgoods

Some embodiments further include a hardgood or mounting device. Exemplary hardgoods or mounting devices include, for example, hooks, knobs, clips, and loops. In some embodiments, the hardgood resembles a nail. In some embodiments, the hardgood has a single outward projection to act as a hanging surface. In some embodiments, the hardgood has multiple outward projections to act as a hanging surface. In some embodiments, the hardgood has is molded into a shape that can hold one or more items within such as but not limited to a box or caddy. In some embodiments, the hardgood is a shelf, ledge, or rack. In some embodiments, the hardgood is a bar wherein the bar can be straight or curved or substantially a ring wherein the bar can be mounted parallel or normal to the substrate surface. In some embodiments, the hardgood uses multiple methods for mounting or hanging items. Any of the following mounting devices can be used with the adhesive article of the present disclosure: Application Matter No. 77486US002 (assigned to the present assignee), U.S. Pat. No. 5,409,189 (Luhmann), U.S. Pat. No. 5,989,708 (Kreckel), U.S. Pat. No. 8,708,305 (McGreevy). U.S. Pat. No. 5,507,464 (Hamerski et al.), U.S. Pat. No. 5,967,474 (doCanto et al.), U.S. Pat. No. 6,082,686 (Schumann), U.S. Pat. No. 6,131,864 (Schumann), U.S. Pat. No. 6,811,126 (Johansson, et al.), U.S. Pat. No. D665,653, and U.S. Pat. No. 7,028,958 (Pitzen, et al.), all of which are incorporated by reference in their entirety herein. The hardgood may be any object to be mounted to a substrate.

In some embodiments, the hardgood is mounted to the substrate in one or more places wherein one or more of the mounting locations contain an adhesive article described in this invention. In some embodiments, the hardgood is mounted using a combination of removable article(s) and conventional mechanical fasteners including but not limited to nails, screws, bolts, and rivets.

In some embodiments, the hardgood is made from of thermoplastic polymers. In some embodiments, the hardgood is made from thermoset polymers. In some embodiments, the hardgood is made using polyolefin materials. In some embodiments, the hardgood is made using polycarbonate materials. In some embodiments, the hardgood is made using high-impact polystyrene. In some embodiments, the hardgood is made using acrylonitrile-butadiene-styrene (ABS) terpolymers. In some embodiments, the hardgood is made using two or more polymeric materials. In some embodiments, the hardgood is made from metal. In some embodiments, the hardgood is made from stainless steel. In some embodiments, the metal is painted, glazed, stained, brushed, or coated to alter its appearance. In some embodiments, the hardgood is made from ceramic. In some embodiments, the hardgood is made from glazed ceramic. In some embodiments, the hardgood is made from unglazed ceramic. In some embodiments, the hardgood is comprised of naturally-based materials such as wood, bamboo, particle board, cloth, canvas, or derived from biological sources, and the like. In some embodiments, the naturally-based materials may be painted, glazed, stained, or coated to change their appearance. In some embodiments, the hardgood is made using two or more materials from the list above. In some embodiments, the hardgood is made from two pieces that are reversibly or irreversibly attached, joined, or welded together.

In some embodiments, the hardgood comprises two pieces wherein the first piece acts as a mounting surface for attaching the adhesive article to a substrate, and the second piece acts as a hanging member which may be used for hanging or mounting objects to the substrate. The two pieces may be reversibly attached using mechanical fasteners, hook and loop materials, or an additional adhesive layer.

The hardgood can be made using any method known in the art.

In some embodiments, the peelable adhesive layer(s) and core may be attached to the hardgood using a lamination process. In some embodiments, the peelable adhesive layer(s) and core may be attached to the hardgood using multiple lamination processes.

In some embodiments, the core may be attached to the hardgood using two or more injection molding steps in using one or more molds. In some embodiments, the core and/or the peelable adhesive layer(s) may be attached manually by the end user.

Method of Making the Adhesive Articles Described Herein

The adhesive articles described herein can be made in various ways. One embodiment involves disposing an adhesive onto or adjacent to a major surface of a core. In some embodiments, a second adhesive is disposed onto the other major surface of the core.

The adhesive can be disposed on the core in any known way, including, for example, the pressure sensitive adhesive composition can be coated onto a release liner, coated directly onto a carrier, or formed as a separate layer (e.g., coated onto a release liner) and then laminated to a carrier. An adhesive can be deposited onto a core with a known deposition method, including e.g., solvent coating methods, water-borne coating methods, or hot melt coating methods, e.g., knife coating, roll coating, reverse roll coating, gravure coating, wire wound rod coating, slot orifice coating, slot die coating, extrusion coating, or the like.

Adhesive interfaces may be created within the core, or along one or more edges of the core, by any of the methods described above or those described in the Examples below.

Methods of Using the Adhesive Articles Described Herein

The peelable articles of the present disclosure can be used in various ways. In some embodiments, the adhesive article is applied, attached to, or pressed into an adherend. In this way, the adhesive article contacts the adherend. Where a release liner is present, the release liner is removed before the adhesive article is applied, attached to, or pressed into an adherend. In some embodiments, at least a portion of the adherend is wiped with alcohol before the adhesive article is applied, attached to, or pressed into an adherend.

To remove the adhesive article from the adherend, at least a portion of the adhesive article is peeled or stretched away from the adherend. In some embodiments, the angle of stretch is 350 or less. In embodiments where a tab is present, the user can grip the tab and use it to release or remove the adhesive article from the adherend.

The adhesive articles can be used in isolation, as one of many articles attached to a surface, or as part of a stack of adhesive articles. In the latter implementation, the resulting construction would include a plurality of adhesive articles disposed in vertical relation to one another.

Uses

The adhesive articles may be used in wet or high humidity environments such as those found in bathrooms. For example, they can be adhered to toilets (e.g. toilet tanks), bathtubs, sinks, and walls. The adhesive article may be used in showers, locker rooms, steam rooms, pools, hot tubs, and kitchens (e.g., kitchen sinks, dishwashers and back splash areas, refrigerators and coolers). The adhesive article may also be used in low temperatures applications including outdoor applications and refrigerators. Useful outdoor applications include bonding articles such as signage to outdoor surfaces such as windows, doors and vehicles.

The adhesive articles may be used to mount various items and objects to surfaces such as painted drywall, plaster, concrete, glass, ceramic, fiberglass, metal or plastic. Items that can be mounted include, but are not limited to, wall hangings, organizers, holders, baskets, containers, decorations (e.g., holiday decorations), calendars, posters, dispensers, wire clips, body side molding on vehicles, carrying handles, signage applications such as road signs, vehicle markings, transportation markings, and reflective sheeting.

The adhesive articles may be used to mount items and materials, such as anti-slip mats or anti-fatigue mats, to a floor surface or the bottom of a tub or shower, or to secure items, such as area rugs, to a floor. The adhesive article can be used in various joining and assembling applications including such as adhering at least two containers (e.g., boxes) for later separation. The adhesive article can be used in various cushioning and sound deadening applications such as, for example, cushioning materials for placement beneath objects, sound insulating sheet materials, vibration dampening, and combinations thereof. The adhesive article can be used in various closure applications including container closures (e.g., box closures, closures for food containers, and closures for beverage containers), diaper closures, and surgical drape closures. The adhesive article can be used in various thermal insulation applications.

The adhesive article can be used in various sealing applications such as in gaskets for liquids, vapors (e.g., moisture), and dust. The adhesive article can be used in various labels such as removable labels (e.g., notes, price tags, and identification labels on containers), and in signage. The adhesive article can be used in various medical applications (e.g., bandages, wound care, and medical device labeling such as in a hospital setting). The adhesive article can be used in various fastening applications such as fastening one object (e.g., a vase or other fragile object) to another object (e.g., a table or a book shelf). The adhesive article can be used in various securing applications such as fastening one or more components of a locking mechanism to a substrate (e.g., a child safety lock can be adhered to a cabinet or cupboard). The adhesive article can be used in various tamper indicating applications (e.g., tamper indicating articles). The adhesive article can also be incorporated in a variety of other constructions including, but not limited to, abrasive articles (e.g., for sanding), articles for sanding and polishing applications (e.g., buffing pads, disc pads, hand pads, and polishing pads), pavement marking articles, carpeting (e.g., backing for carpeting), and electronic devices (e.g., securing a battery within a housing in a cell phone or PDA (personal digital assistant) to prevent unwanted movement).

The adhesive article (i.e., those in adhesive tapes or single article) can be provided in any useful form including, e.g., tape, strip, sheet (e.g., perforated sheet), label, roll, web, disc, and kit (e.g., an object for mounting and the adhesive tape used to mount the object). Likewise, multiple adhesive articles can be provided in any suitable form including, e.g., tape, strip, sheet (e.g., perforated sheet), label, roll, web, disc, kit stack, tablet, and combinations thereof in any suitable package including, for example, dispenser, bag, box, and carton.

The need also exists for an adhesive article with desirable optical properties that allow it to be used to affix a substrate, such as an optical lens or cover, to an optical display device, such as a cellular telephone or portable music player (e.g., MP3 players). In such end use applications, it can be desirable that the adhesive article be optically clear.

Adhesive articles can also be initially repositionable and may even be reusable in some core iterations until one of the adhesive layers loses tack. As used herein. "repositionable" means an adhesive article that can be applied to a substrate and then removed and reapplied without distorting, defacing, or destroying the adhesive article, or substrate.

EMBODIMENTS

1. An adhesive article comprising: a first peelable adhesive layer, a second peelable adhesive layer, a discrete core disposed between the first and second peelable adhesives, and having first and second major surfaces, wherein the core defines a core plane coincident with the first major surface; and a plurality of adhesive contact areas each comprising an interface between the first and second adhesive layers.

2. The adhesive article of embodiment 1, wherein each interface exists out of the core plane.

3. The adhesive article of embodiments 1 or 2, wherein the core includes a multilayer film.

4. The adhesive article of embodiment 3, wherein the multilayer film includes a film core and at least one skin layer.

5. The adhesive article of embodiments 1-4, wherein the core includes a discontinuous layer of material.

6. The adhesive article of embodiments 1-4, wherein the core includes a continuous layer of material.

7. The adhesive article of embodiments 1-6, wherein the first adhesive layer is adhesively bonded to the core.

8. The adhesive article of embodiments 1-7, wherein the core includes a nonwoven material.

9. The adhesive article of embodiments 1-8, wherein the core defines a series of apertures, and wherein each interface is located within an aperture.

10. The adhesive article of embodiment 1, wherein the core includes a third adhesive in contact with the first adhesive, and wherein the peel strength at each interface is greater than the peel strength between the first and third adhesives.

11. The adhesive article of embodiments 1-2, where in the core consists of a plurality of particles of a size sufficient to prevent contact between the first and second adhesive layers.

12. The adhesive article of embodiment 11, wherein the particles are selected from the group consisting of wood, metals, metal oxides, ceramics, and combinations thereof.

13. The adhesive article of embodiment 1, wherein article includes a core interface between the first adhesive layer and the core, and wherein the adhesive bond strength at the adhesive interfaces is greater than the adhesive bond strength at the core interface.

14. The adhesive article of any of the previous embodiments, wherein the application of force in a direction normal to the core plane results in a loss of structural integrity within the core.

15. The adhesive article of any of the previous embodiments, wherein the core defines a perimeter, and wherein the adhesive contact areas surround the perimeter.

16. The adhesive article of embodiment 15, wherein the adhesive contact areas include at least one continuous seam extending along a portion of the perimeter.

17. The adhesive article of embodiments 1-16, wherein the core defines a perimeter boundary, and wherein the adhesive contact areas are disposed within the boundary.

18. An adhesive article for mounting objects, the article comprising: a first peel release adhesive layer, a second peel release adhesive layer, a core defining a perimeter boundary disposed between the first and second adhesive layers; and a plurality of seams extending along at least a portion of the perimeter boundary, wherein the seams comprise an interface between the first and second adhesive layers.

19. The adhesive article of embodiment 18, wherein the plurality of seams includes a seam extending along at least two sides of the boundary.

20. The adhesive article of embodiments 18-19, wherein the plurality of seams surrounds the boundary.

21. The adhesive article of embodiments 18-20, wherein a shape of the boundary is one of square, rectangular, circular, ovular, and tetrahedral.

22. The adhesive article of embodiments 18-21, wherein the core includes a layer of nonwoven material.

23. The adhesive article of embodiment 22, wherein the core includes a release layer disposed between the nonwoven material and the first adhesive layer.

24. The adhesive article of embodiments 18-23, wherein the core defines a plane, the plane being substantially parallel to an interface between the first adhesive layer and the core.

25. The adhesive article of embodiment 24, wherein the 900 Degree Adhesion Strength of the article is at least 40 oz/in$^2$.

26. The adhesive article of embodiments 18-25, wherein the article is adhered to a surface and the first adhesive layer is removed from the surface at a peel angle of at least 35 degrees, the core does not substantially contribute to the peel force.

27. The adhesive article of embodiment 26, wherein the first adhesive layer is bonded to the core, and wherein removal of the first adhesive layer from the mounting surfaces results in a debonding of the first adhesive from the core.

28. The adhesive article of embodiments 18-27, wherein the removal of the first adhesive layer from the mounting surface does not result in debonding in at least one of the seams.

29. The adhesive article of embodiment 18, and further comprising a release liner on a surface of the first adhesive layer opposite the core.

30. The adhesive article of embodiments 18-29, and further comprising a hardgood on a surface of the first adhesive layer opposite the core.

31. The adhesive article of embodiments 18-29, and further comprising a frame or a poster on a surface of the first adhesive layer opposite the core.

32. The adhesive article of embodiments 18-29, wherein the core has a tensile and/or elastic modulus of between about 50 psi and about 5000 psi as measured according to ASTM D638.

33. The adhesive article of embodiment 18, wherein the core is optically clear.

34. The adhesive article of embodiment 18, wherein the core includes a multilayer film comprising: a core layer comprising at least one of an elastomeric material, an elastomeric polymer, SEBS. SEPS, SIS, SBS, polyurethane, ethyl vinylacetate (EVA), ethyl methyl acrylate (EMA) ultra low linear density polyethylene (ULLDPE), hydrogenated polypropylene, and combinations or blends thereof, and a first skin layer comprising at least one of polypropylene, polyethylene, high density polyethylene (HDPE), low density polyethylene (LDPE), linear low density polyethylene (LLDPE), a polyurethane, EVA. EMA, an adhesive, and combinations or blends thereof.

35. An adhesive article for mounting an object to a surface, the article comprising: a first adhesive layer, a second adhesive layer; a core defining a perimeter, the core disposed between the first adhesive layer and the second adhesive layer, and a plurality of adhesive contact areas, wherein the adhesive contact areas comprise an interface between the first and second adhesive layers, and wherein the adhesive contact areas are located within the perimeter of the core.

36. The adhesive article of embodiment 35, wherein the core includes a nonwoven.

37. The adhesive article of embodiment 35, wherein the core comprises a plurality of particles of a size sufficient to prevent a portion of the first and second adhesive layers from establishing an interface.

38. The adhesive article of embodiment 35, wherein the core includes an aperture, and the wherein at least one of the adhesive contact areas is located within the aperture.

39. The adhesive article of any of the preceding embodiments, where the adhesive article releases from a surface of an adherend when the article is peeled at an angle of about 35° or greater from the adherend surface.

40. The adhesive article of any of the preceding embodiments, wherein the adhesive article removes from an adherend damage-free.

41. The adhesive article of embodiment 35, wherein at least the first adhesive layer debonds from the core when the adhesive article is removed at an angle of greater than 35 degrees, and wherein the first adhesive layer does not debond from the second adhesive layer at each of the interfaces when the adhesive article is removed at an angle of greater than 35 degrees.

42. The adhesive article of any of the preceding embodiments, wherein the peelable adhesive includes at least one of SBS, SBR, SIS, SEBS, acrylate, and/or polyurethane.

43. The adhesive article of any of the preceding embodiments, wherein the peelable adhesive includes at least one of the following tackifiers: polyterpene, terpene phenol, rosin esters, hydrocarbons, C5 resins, C9 resins, and/or rosin acids.

44. The adhesive article of any of the preceding embodiments, wherein the peelable adhesive includes at least one of an acrylate, a polyurethane, a tackified rubber adhesives, such as natural rubber, olefins; silicones, such as silicone polyureas: synthetic rubber adhesives such as polyisoprene, polybutadiene, and styrene-isoprene-styrene, styrene-ethylene-butylene-styrene and styrene-butadiene-styrene block copolymers. SBR, SEBS, and other synthetic elastomers; and tackified or untackified acrylic adhesives such as copolymers of isooctylacrylate and acrylic acid, which can be polymerized by radiation, solution, suspension, or emulsion techniques; polyurethanes; silicone block copolymers; and combinations thereof.

45. An object for mounting to a surface, the object comprising: a hardgood having a first major surface: a discrete core defining a first surface in contact with the hardgood and a second surface opposing the first surface: an adhesive layer bonded to both the first major surface of the hardgood and the second surface of the core, wherein the peel release force necessary to remove the adhesive from the hardgood is greater than peel release force necessary to at least one of debond the adhesive from the core or cause delamination of the core.

46. The mounting object of embodiment 45, wherein the hardgood includes at least one of a hook, a knob, a clip, a caddy, a box, and/or a loop.

47. A method of using an adhesive article, comprising: contacting the adhesive article of any of embodiments 1-46 with an adherend surface.

48. The method of embodiment 47, further comprising: peeling the adhesive article from the adherend surface: to remove at least a portion of the adhesive article from the adherend surface, where the adhesive article is peeled at an angle of 35° or greater.

49. The method of embodiment 48, wherein the structural integrity of the core is compromised during the step of peeling the adhesive article from the adhered surface.

50. The method of embodiment 48 or 49, wherein the peeling the adhesive article from the adhered surface causes the first adhesive layer to debond from the core.

51. The method of the above embodiments 48-50, wherein first adhesive layer remains bonded to the second adhesive layer at the adhesive contact area during as the adhesive article is peeled.

The following examples describe some exemplary constructions and methods of constructing various embodiments within the scope of the present application. The following examples are intended to be illustrative, but the particular materials and amounts thereof recited in these examples, as well as other conditions and details, should not be construed to unduly limit this disclosure.

EXAMPLES

TABLE 1

Material and supplier information

| | Material | Description | Supplier |
|---|---|---|---|
| Multilayer Film | KRATON G1657 | Styrene-Ethylene-Butylene-Styrene Block Copolymer (SEBS) | KRATON Performance Polymers, Inc., Houston, TX |
| | ENGAGE 8450 Polyolefin Elastomer | Ethylene-Octene Copolymer | Dow Chemical Co., Midland MI |
| Other Core Materials | 3M Secondary Release Liner 5002 | PET Liner with proprietary silicone-based release coating | 3M Company, St. Paul MN |
| | Nonwoven Web | Spun-bond Polypropylene Nonwoven | 3M Company, St. Paul MN |
| | NIKELODEON GALACTIC GAK | Satellite Blue, Poly-vinyl(alcohol) based hydrogel | NSI International, Inc., New York, NY |
| | SMOOTH-ON Universal Mold Release | Aerosol release spray | Smooth-On, Inc., Macungie, PA |
| | K37 Glass Bubbles | 45-micron soda-lime-borosilicate hollow glass microspheres | 3M Company, St. Paul MN |
| Rubber-based Adhesive | KRATON D1184 | Radial Styrene-Butadiene Block Copolymer (SBS) | KRATON Performance Polymers, Inc., Houston, TX |
| | SOLPRENE 1205 | Styrene-Butadiene Rubber (SBR) | Dynasol Elastomers, Houston, TX |
| | POLYSTER T160 (YS T160) | Terpene phenolic resin | Yasuhara Chemical Company, Ltd., Fuchu-city, Hiroshima, Japan |

Test Methods

Lap Shear (0° Peel) Adhesion Strength Test

The peel adhesion strength and removability were evaluated by the following method. Test constructions were applied to adherends by hand under moderate pressure (roughly 5 pounds) for 5 seconds. Adhered samples were aged at 72° F. (22° C.). 50%, relative humidity for 3 days before testing Immediately preceding the test, the adhesive construction's remaining liner was removed and a stainless steel shim (6"×2"×0.031", obtained from ChemInstruments, West Chester Township, Ohio) was applied to the top adhesive surface with moderate pressure (roughly 5 pounds) for 5 seconds. Exposed edges of tile adherend and stainless steels him were placed in opposing clamps on the INSTRON universal testing machine. The shear tests were conducted with an INSTRON universal testing machine with a crosshead speed of 12 in/min (30.5 cm/min) until the construction removed from the adherend surface. The load cell force was recorded as a function of crosshead displacement. Four replicates were tested for each sample.

90° Peel Adhesion Strength Test

The peel adhesion strength and removability were evaluated by the following method. Test constructions were applied to adherends by hand under moderate pressure (roughly 5 pounds) for 5 seconds. Adhered samples were aged at 72° F. (22° C.), 50% relative humidity for 3 days before testing. Immediately preceding the test, the adhesive construction's remaining liner was removed and an aluminum t-bar (Aluminum 6061-T6 bare t-bar 1.5"×1.5"×0.25" cut to 1.5", OnlineMetals, Seattle Wash. was applied to the top adhesive surface with moderate pressure (roughly 5 pounds) for 5 seconds. The adherend was clamped to a flat surface and the aluminum t-bar was placed in the top clamp of an INSTRON universal testing machine. The peel tests were conducted with an INSTRON universal testing machine with a crosshead speed of 12 in/min (30.5 cm/min) until the construction removed from the adherend surface.

The load cell force was recorded as a function of crosshead displacement. If any adhesive remained on the adherend, it was removed by hand to better observe damage level. Four replicates were tested for each sample. The damage visual evaluation was as follows: 0—no damage, 1—small paint bubble (less than 10% of surface area), 2—large paint bubble (great than 10% of surface area), 3—small paper tear, 4—Paper tear/damage (<50%), 5—Paper tear damage (>50%). Two replicates were tested for each sample.

Weight Hanging Test

Figure 11:
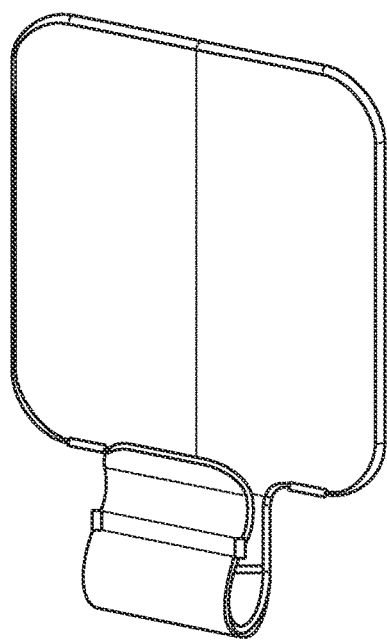
FIG. 11 is a perspective view of a hook used to conduct the Weight Hanging Test on Exemplary adhesive articles of the present disclosure.

Test constructions were applied first to 1.25 in. by 1.35 in. injection molded polycarbonate hooks, each hook having a thickness of 30 mils and of the type depicted in FIG. 11, by hand under moderate pressure (roughly 5 pounds) for 5 seconds. The hook and adhesive construction was then applied to the adherend by hand under moderate pressure (roughly 5 pounds for 5 seconds) such that the hook was positioned at the bottom of the constriction allow the hanging of weights. A plastic bag containing steel shot (0.5 pounds) was suspended from the hook immediately after application to the wallboard adherend. Samples were observed after 1, 24, 48, and 72 hours of hanging and failures were recorded at each time point. All samples were tested in 3 replicates except Example 9 which had 2 replicates. The performance value is an average of the hang time for all replicates of a given example such that the maximum performance value would be 72 hours and the minimum would be 0 hours.

Determination of Peak Force

The peak force for each of the adhesion strength tests was determined from the raw data output from INSTRON Bluehill 3 software, which recorded crosshead displacement and force (oz). The peak force was then divided by the active adhesive area to obtain a force (ounces) per unite area (square inches).

Test Adherends

Drywall panels (obtained from Materials Company, Metzger Building, St. Paul, Minn.) were painted Sherwin-Williams DURATION Interior Acrylic Latex Ben Bone White Paint (Sherwin-Williams Company, Cleveland, Ohio) for peel tests and Behr Premium Plus Ultra Flat Egyptian Nile Paint & Primer in One Interior Paint (Behr Process Corporation, Santa Ana, Calif.) for weight hanging tests.

Procedure for painting: a first coat of paint was applied to a panel by paint roller, followed by air drying for approximately 1 hour at ambient conditions. A second coat of paint was applied and dried at ambient conditions for at least 7 days at ambient conditions before use.

Examples 1-9 and Comparative Examples 14 and Controls 1-2

TABLE 2

Example Constructions

| Example | Adhesive | Adhesive Geometry | Core | Seam Geometry | Construction | Active Adhesive Area |
|---|---|---|---|---|---|---|
| Control 1 | Adhesive 1 | 1" × 1" | Nonwoven | None | | 1" |
| Control 2 | Adhesive 1 | 1" × 1" | None | Continuous, Planar | | 1" |
| Example 1 | Adhesive 1 | 1.25" × 1.25" | Nonwoven | Perimeter | Die cut, Place Core, Seal | 1" |
| Example 2 | Adhesive 2 | 1.25" × 1.25" | Nonwoven | Perimeter | Die cut, Place Core, Seal | 1" |
| Example 3 | Adhesive 1 | 1.25" × 1.25" | Multilayer Film coated in Release Spray | Perimeter | Die cut, Place Core, Seal | 1" |
| Example 4 | Adhesive 1 | 1.25" × 1.25" | NICKELODEON GAK | Perimeter | Die cut, Place Core, Seal | 1" |
| Example 5 | Adhesive 1 | 1.25" × 1.25" | Glass Bubbles | Perimeter | Die cut, Place Core, Seal | 1" |
| Example 6 | Adhesive 1 | 1.25" × 1.25" | Secondary Release Liner 5002 | Perimeter | Die cut, Place Core, Seal | 1" |
| Example 7 | Adhesive 1 | 1" × 1" | Nonwoven | 9-circle | Die cut, Punch, Place Core, Laminate | 1" |
| Example 8 | Adhesive 2 | 1" × 1" | Nonwoven | 9-circle | Die cut, Punch, Laminate | 1" |

TABLE 2-continued

Example Constructions

| Example | Adhesive | Adhesive Geometry | Core | Seam Geometry | Construction | Active Adhesive Area |
|---|---|---|---|---|---|---|
| Example 9 | Adhesive 1 | 1.25" × 1.25" | Multi-layer Release Liner Construction | Perimeter and 9-circle | Die cut, Laminate parts, Punch, Place Core, Seal | 1" |
| Comparative Example 1 | | GLU DOTS Removable Dot N' Go Dispenser ⅜" Diameter Circles | | | | 0.44" |
| Comparative Example 2 | | VELCRO Hanging Strip, Die Cut 1" × 1" Tape with ⅞" Coin | | | | 0.60" |
| Comparative Example 3 | | FOREVER IN TIME 3D Pop Dots, ½" Circles | | | | 0.785" |
| Comparative Example 4 | | UGLU Glue Strips, Die Cut to 1" × 1" Tape | | | | 1" |

Multilayer Film

The multilayer film used in Examples was prepared by coextruding a sheet of elastomeric core material together with two skin layers, one on either side of the elastomeric core layer, using a continuous coextrusion process like that described for Example 3 in U.S. Pat. No. 5,501,679. Details of the multilayer film construction are provided in Table 3. The film is similar to Example 16 from PCT Publication WO2017/136432

TABLE 3

Multilayer Film Construction

| Core Layer Material | Skin Layer Material | Core Layer Thickness (µm) | Skin Layer Thickness (µm) | Core Layer to Skin Layer Ratio | Total Film Thickness (µm) |
|---|---|---|---|---|---|
| KRATON 1657 | ENGAGE 8450 | 455.3 | 16.7 | 27/1 | 495 |

Nonwoven Web

A nonwoven web was obtained from 3M Company, St. Paul Minn., of the general type described in U.S. Pat. No. 8,162,153. The web was a spunbond web with a basis weight of 65 grams per square meter and an Effective Fiber Diameter (as defined and described in the '153 patent) of 18.40 µm.

Pressure Sensitive Adhesive Compositions

Adhesive 1: A pressure-sensitive adhesive composition was prepared having a 15:85 ratio of KRATON D1184 to SOLPRENE 1205 as the elastomer component and 35 parts of total tackifier component based on 100 parts of total elastomer. All of the components were added to a glass jar along with toluene to make a solution of approximately 30% solids. The jar was sealed and the contents thoroughly mixed by placing the jar on a roller at about 2-6 rpm for at least 24 hours prior to coating.

Adhesive 2: A silicone polyurea block copolymer based pressure-sensitive adhesive composition was prepared according to the method described for Example 28 in U.S. Pat. No. 6,569,521, except that the composition was prepared to have the weight % MQ resin amount of 50.

Preparation of Transfer Adhesives

Adhesive 1: The pressure sensitive adhesive compositions above were knife-coated onto a paper liner web having a silicone release surface. The paper liner web speed was 2.75 meter/min. After coating, the web was passed through an oven 11 meters long (residence time 4 minutes total) having three temperature zones. The temperature in zone 1 (2.75 meter) was 57° C.; temperature in zone 2 (2.75 meter) was 710° C.: temperature in zone 3 (about 5.5 meter) was 82° C. The caliper of the dried adhesive was approximately 2.0 mils thick. Transfer adhesives were then stored at ambient conditions.

Adhesive 2: Pressure sensitive adhesive compositions were knife-coated onto a paper liner web having a silicone release surface. The paper liner web speed was 2.75 meter/min. After coating, the web was passed through an oven 11 meters long (residence time 4 minutes total) having three temperature zones. The temperature in zone 1 (2.75 meter) was 57° C.; temperature in zone 2 (2.75 meter) was 800° C.; temperature in zone 3 (about 5.5 meter) was 930° C. The caliper of the dried adhesive was approximately 2.5-3.0 mils thick. The transfer adhesives were then stored at ambient conditions.

Preparation of Adhesive Article Constructions

Control 1: One side of a nonwoven webs (approximately 6"×12") was corona treated. Adhesive on liner was hand-laminated onto the surface and then passed through a roll laminator at a speed of approximately 12 inches per minute at a pressure of 40 PSI. The second (exposed) side of the nonwoven web was then corona treated and adhesive on liner was hand-laminated and passed through the roll laminator under the same conditions. Finally, the entire construction was sent through the roll laminator under 100 PSI at a rate of 12 inches per minute. 1"×1" square adhesive constructions were die-cut from the assembled laminate.

Control 2: Adhesive was placed between liners and die-cut to 1"×1" squares. One liner was removed such that one side of the adhesive square was exposed and two squares were hand-laminated together.

Examples 1-6

Adhesive was placed between liners and die-cut to 1.25"× 1.25" squares. One liner was removed such that 1 side of the adhesive square was exposed. The core material (see below) was centered on the exposed adhesive such as to leave a 0.125" border of exposed adhesive around the perimeter of the construction. A second adhesive square was then laminated on top and hand-sealed such that the 0.125" border formed a seam around the core.

Examples 1 and 2: 1"×1" die-cut nonwoven squares

Example 3: Multilayer film coated with SMOOTH-ON release spray (applied according to manufacturer specifications)

Example 4: 1.0 gram of GAK was cooled in a freezer (~10° F.) and then shaped to an approximately 1"×1" square before sealing between adhesives Example 5: 0.05 grams of glass bubbles were placed in the center of the adhesive square and spread out to cover approximately 1"×1" square before sealing between adhesives.

Example 6: 1"×1" squares were die cut from the release liner material. Two pieces of release liner were stacked such that the release-coated sides were opposing each other and facing the adhesive surfaces.

Examples 7-8

Adhesive was placed between liners and die-cut to 1"×1" squares. Nonwoven core material was punched by hand with a 1/16" hollow punch such that 1/16" gaps formed in the core material. Gaps were spaced 3/8" center-center at a density of 9 holes per core. One liner was removed such that 1 side of the adhesive square was exposed. The core material was laminated between adhesives layers by hand such that the die-cut holes formed seams.

Example 9

Adhesive was placed between liners and die-cut to 1.25"×1.25" squares and 1"×1" squares. Core material was constructed by die cutting 1"×1" squares from 3M secondary release liner 5002 and then laminating a stack of 1"×1" liner—1"×1" adhesive—1"×1" liner such that the non-release portions faced inwards toward the 1"×1" adhesive square and the release surface faced outwards. The 3-layer core was punched by hand with a 1/16" hollow punch such that 1/16" gaps formed in the core material. Gaps were spaced 3/8" center-center at a density of 9 holes per core. One liner was removed such that 1 side of the 1.25"×1.25" adhesive square was exposed. The core material was laminated between 1.25"×1.25" adhesives layers by hand such that the die-cut holes formed seams.

Comparative Examples 1-4

Samples were applied to the adherend as-received in a format that most closely resembled a 1"×1" square footprint

TABLE 4

Lap Shear (0° Peel) Adhesion Strength Test Data

| Example | Average of Max Load (oz/in$^2$) |
|---|---|
| Control 1 | 11.7 |
| Control 2 | 181.2 |
| 1 | 22.7 |
| 2 | 13.4 |
| 3 | 13.8 |
| 4 | 16.6 |
| 5 | 15.3 |
| 6 | 28.8 |
| 7 | 35.0 |
| 8 | 17.7 |
| 9 | 56.4 |
| Comparative Example 1 | 49.6 |
| Comparative Example 2 | 242.7 |
| Comparative Example 3 | 419.5 |
| Comparative Example 4 | 62.6 |

TABLE 5

90° Peel Adhesion Strength Test Data

| Example | Average of Max Load (oz/in$^2$) | Average of Damage Visual rating (0 to 5) | Ratio Lap Shear:90° Peel |
|---|---|---|---|
| Control 1 | 15.1 | 0 | 0.77 |
| Control 2 | 296.5 | 3 | 0.61 |
| 1 | 113.9 | 0 | 0.20 |
| 2 | 31.4 | 0 | 0.43 |
| 3 | 105.2 | 0 | 0.13 |
| 4 | 134.1 | 0 | 0.12 |
| 5 | 17.6 | 0 | 0.87 |
| 6 | 186.6 | 0 | 0.15 |
| 7 | 132.6 | 0 | 0.26 |
| 8 | 45.2 | 0 | 0.39 |
| 9 | 165.7 | 0 | 0.34 |
| Comparative Example 1 | 231.7 | 3.25 | 0.21 |
| Comparative Example 2 | 103.3 | 2 | 2.35 |
| Comparative Example 3 | 525.7 | 1.75 | 0.80 |
| Comparative Example 4 | 576.5 | 5 | 0.11 |

TABLE 6

Weight Hanging Test Data

| Example | Average Time Hanging 2 lbs (hours) |
|---|---|
| Control 1 | 8 |
| Control 2 | 72 |
| 1 | 25 |
| 2 | 9 |
| 3 | 48 |
| 4 | 0 |
| 5 | 72 |
| 6 | 72 |
| 7 | 56 |
| 8 | 1 |
| 9 | 72 |
| Comparative Ex. 1 | 0 |
| Comparative Ex. 2 | 72 |
| Comparative Ex. 3 | 1 |
| Comparative Ex. 4 | 72 |

Lap shear gives an indication of the force required for an article to fail in shear. The data shows that a solid slab of adhesive (Control 2) gives the highest values for a given adhesive composition, but causes damage. The presence of a core as described in the invention provides a damage-free release but at the expense of shear strength. The presence of a core and a seam (Examples 1-9) improves the shear performance while maintaining a damage-free peel removal between two rigid surfaces. By contrast, the Comparative Examples each cause damage while showing varying degrees of shear performance. The weight hanging test data show the composition of the core and the format of the seam can both be tuned to affect the weight hanging performance.

The recitation of all numerical ranges by endpoint is meant to include all numbers subsumed within the range (i.e., the range 1 to 10 includes, for example, 1, 1.5, 3.33, and 10).

The patents, patent documents, and patent applications cited herein are incorporated by reference in their entirety as if each were individually incorporated by reference. It will be apparent to those of ordinary skill in the art that various changes and modifications may be made without deviating from the inventing concepts set from above. Thus, the scope of the present disclosure should not be limited to the structures described herein. Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following claims and equivalents thereof.

We claim:

1. An adhesive article for mounting objects, the article comprising:
   a first peel release adhesive layer;
   a second peel release adhesive layer;
   a core defining a perimeter boundary disposed between the first and second adhesive layers; and
   a plurality of seams defining an interface between the first and second adhesive layers, wherein the seams extend along at least a portion of the perimeter boundary, and wherein the article is configured such that removal of the article from an adherend at a peel angle exceeding 35 degrees results in at least one of delamination of the first peelable adhesive layer from the core or degradation of the core.

2. The adhesive article of claim 1, wherein the plurality of seams includes a seam extending along at least two sides of the boundary.

3. The adhesive article of claim 1, wherein the core includes a layer of nonwoven material, and wherein the core includes a release layer disposed between the nonwoven material and the first adhesive layer.

4. The adhesive article of claim 1, wherein the core defines a plane, the plane being substantially parallel to an interface between the first adhesive layer and the core.

5. The adhesive article of claim 1, wherein the first adhesive layer is bonded to the core, and wherein at least one of a removal of the first adhesive layer from a mounting surfaces results in a debonding of the first adhesive from the core; and removal of the first adhesive layer from the mounting surface does not result in debonding in at least one of the seams.

6. An adhesive article comprising:
   a first peelable adhesive layer;
   a second peelable adhesive layer;
   a discrete core disposed between the first and second peelable adhesives, and having first and second major surfaces, wherein the core defines a core plane coincident with the first major surface; and
   a plurality of adhesive contact areas each comprising an interface between the first and second adhesive layers, wherein each interface exists out of the core plane, and wherein the article is configured such that removal of the article from an adherend at a peel angle exceeding 35 degrees results in at least one of delamination of the first peelable adhesive layer from the core or degradation of the core.

7. The adhesive article of claim 6, wherein the first adhesive layer is adhesively bonded to the core.

8. The adhesive article of claim 6, wherein the core includes a nonwoven material.

9. The adhesive article of claim 6, wherein the core defines a series of through-holes extending through thickness of the core, and wherein each interface is located within a through-hole.

10. The adhesive article of claim 9, wherein the through-holes are arranged in a pattern.

11. The adhesive article of claim 6, where in the core consists of a plurality of particles of a size sufficient to prevent contact between the first and second adhesive layers, and wherein the particles are selected from the group consisting of wood, metals, metal oxides, ceramics, and combinations thereof.

12. The adhesive article of claim 6, wherein article includes a core interface between the first adhesive layer and the core, and wherein the adhesive bond strength at the adhesive interfaces is greater than the adhesive bond strength at the core interface.

13. The adhesive article of claim 6, wherein the core defines a perimeter, and wherein the adhesive contact areas surround the perimeter.

14. The adhesive article of claim 13, wherein the adhesive contact areas include at least one continuous seam extending along a portion of the perimeter.

15. The adhesive article of claim 6, wherein the core defines a perimeter boundary, and wherein the adhesive contact areas are disposed within the boundary.

16. The adhesive article of claim 6, wherein the first and second adhesive layers are not in contact except at the adhesive contact areas.

17. The adhesive article of claim 6, wherein the core comprises a separable connector that, when removed from an adherend at an angle of greater than 35 degrees, separates along a path parallel to the core plane.

18. An adhesive article for mounting an object to a surface, the article comprising:
   A first adhesive layer;
   A second adhesive layer;
   A core defining a perimeter, the core disposed between the first adhesive layer and the second adhesive layer; and
   A plurality of adhesive contact areas, wherein the adhesive contact areas comprise an interface between the first and second adhesive layers, and wherein the adhesive contact areas are located within the perimeter of the core,
      wherein at least the first adhesive layer debonds from the core when the adhesive article is removed at an angle of greater than 35 degrees, and
      wherein the first adhesive layer does not debond from the second adhesive layer at each of the interfaces when the adhesive article is removed at an angle of greater than 35 degrees.

19. The adhesive article of claim 18, wherein the core includes an aperture, and the wherein at least one of the adhesive contact areas is located within the aperture.

* * * * *